United States Patent
Motoyama

(10) Patent No.: US 7,421,496 B2
(45) Date of Patent: Sep. 2, 2008

(54) METHOD AND SYSTEM FOR DIAGNOSIS AND CONTROL OF MACHINES USING CONNECTIONLESS MODES HAVING DELIVERY MONITORING AND AN ALTERNATE COMMUNICATION MODE

(75) Inventor: Tetsuro Motoyama, Cupertino, CA (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 0 days.

(21) Appl. No.: 11/742,939

(22) Filed: May 1, 2007

(65) Prior Publication Data

US 2007/0201496 A1    Aug. 30, 2007

Related U.S. Application Data

(63) Continuation of application No. 08/883,492, filed on Jun. 26, 1997.

(51) Int. Cl.
*G06F 15/173* (2006.01)
*G06F 12/00* (2006.01)

(52) U.S. Cl. .................... 709/224; 709/219; 709/220

(58) Field of Classification Search ............... 709/206, 709/207, 227, 229, 245, 223, 224, 219
See application file for complete search history.

(56) References Cited

U.S. PATENT DOCUMENTS

| | | | |
|---|---|---|---|
| 5,177,680 A | 1/1993 | Tsukino et al. | |
| 5,184,179 A | 2/1993 | Tarr et al. | |
| 5,243,595 A | 9/1993 | Woest et al. | |
| 5,323,393 A | 6/1994 | Barrett et al. | |
| 5,339,156 A | 8/1994 | Ishii | |
| 5,386,276 A | 1/1995 | Swales et al. | |
| 5,412,779 A | 5/1995 | Motoyama | |
| 5,424,724 A | 6/1995 | Williams et al. | |
| 5,425,135 A | 6/1995 | Motoyama et al. | |

(Continued)

FOREIGN PATENT DOCUMENTS

EP    0462 725 A2    12/1991

(Continued)

OTHER PUBLICATIONS

U.S. Appl. No. 11/833,671, filed Aug. 3, 2007, Motoyama et al.

(Continued)

*Primary Examiner*—Zarni Maung
(74) *Attorney, Agent, or Firm*—Oblon, Spivak, McClelland, Maier & Neustadt, P.C.

(57) ABSTRACT

A method and system for retransmitting messages using an alternate mode of communication when an original mode of communication is determined to be unsuccessful. A message is first transmitted using a connectionless-mode of communication such as by using an Internet electronic mail message. A request for acknowledgment of receipt of the message and/or individual operators within the message is requested. If the acknowledgment of receipt of the message is not received within an appropriate time determined based on an urgency level of the reply, the message is retransmitted using a more reliable mode of communication such as a connection-mode of operation which includes a direct telephone connection over a public telephone network using a modem, using an ISDN line, or a cable with a cable modem.

15 Claims, 26 Drawing Sheets

U.S. PATENT DOCUMENTS

| | | | |
|---|---|---|---|
| 5,435,544 | A | 7/1995 | Mandel |
| 5,461,488 | A | 10/1995 | Witek |
| 5,517,497 | A | 5/1996 | Le Boudec et al. |
| 5,533,019 | A | 7/1996 | Jayapalan |
| 5,537,554 | A | 7/1996 | Motoyama |
| 5,537,626 | A | 7/1996 | Kraslavsky et al. |
| 5,544,289 | A | 8/1996 | Motoyama |
| 5,568,618 | A | 10/1996 | Motoyama |
| 5,572,678 | A | 11/1996 | Homma et al. |
| 5,623,605 | A | 4/1997 | Keshav et al. |
| 5,649,120 | A | 7/1997 | Motoyama |
| 5,706,210 | A | 1/1998 | Kumano et al. |
| 5,708,654 | A | 1/1998 | Arndt et al. |
| 5,715,393 | A | 2/1998 | Naugle |
| 5,724,510 | A | 3/1998 | Arndt et al. |
| 5,740,231 | A | 4/1998 | Cohn et al. |
| 5,742,668 | A | 4/1998 | Pepe et al. |
| 5,764,899 | A | 6/1998 | Eggleston et al. |
| 5,774,678 | A | 6/1998 | Motoyama |
| 5,787,149 | A | 7/1998 | Yousefi et al. |
| 5,818,603 | A | 10/1998 | Motoyama |
| 5,819,110 | A | 10/1998 | Motoyama |
| 5,842,043 | A | 11/1998 | Nishimura |
| 5,887,216 | A | 3/1999 | Motoyama |
| 5,896,504 | A | 4/1999 | Shiraki |
| 5,903,559 | A | 5/1999 | Acharya et al. |
| 5,909,493 | A | 6/1999 | Motoyama |
| 5,933,604 | A | 8/1999 | Inakoshi |
| 6,003,070 | A | 12/1999 | Frantz |
| 6,065,136 | A | 5/2000 | Kuwabara |
| 6,067,407 | A | 5/2000 | Wadsworth et al. |
| 6,085,196 | A | 7/2000 | Motoyama et al. |
| 6,108,688 | A * | 8/2000 | Nielsen ............ 709/206 |
| 6,208,956 | B1 | 3/2001 | Motoyama |
| 6,279,015 | B1 | 8/2001 | Fong et al. |
| 6,330,628 | B1 | 12/2001 | Motoyama |
| 6,421,608 | B1 | 7/2002 | Motoyama et al. |
| 6,473,812 | B2 | 10/2002 | Motoyama |
| 6,581,092 | B1 | 6/2003 | Motoyama et al. |
| 6,628,413 | B1 | 9/2003 | Lee |
| 6,631,247 | B1 | 10/2003 | Motoyama et al. |
| 6,662,225 | B1 | 12/2003 | Motoyama et al. |
| 6,714,971 | B2 | 3/2004 | Motoyama et al. |
| 6,785,711 | B1 | 8/2004 | Motoyama et al. |
| 6,801,331 | B1 | 10/2004 | Motoyama |
| 6,839,717 | B1 | 1/2005 | Motoyama et al. |
| 6,857,016 | B1 | 2/2005 | Motoyama et al. |
| 6,889,263 | B2 | 5/2005 | Motoyama |
| 6,915,337 | B1 | 7/2005 | Motoyama et al. |
| 6,915,342 | B1 | 7/2005 | Motoyama |
| 6,928,493 | B2 | 8/2005 | Motoyama |
| 6,948,175 | B1 | 9/2005 | Fong et al. |
| 6,961,659 | B2 | 11/2005 | Motoyama et al. |
| 6,970,952 | B2 | 11/2005 | Motoyama |
| 6,988,141 | B1 | 1/2006 | Motoyama et al. |
| 7,043,551 | B2 | 5/2006 | Motoyama et al. |
| 7,047,293 | B2 | 5/2006 | Motoyama et al. |
| 7,120,674 | B1 | 10/2006 | Motoyama et al. |
| 7,120,707 | B2 | 10/2006 | Motoyama |
| 7,131,070 | B1 | 10/2006 | Motoyama et al. |
| 7,171,670 | B2 | 1/2007 | Motoyama et al. |
| 7,185,080 | B1 | 2/2007 | Motoyama |
| 7,194,560 | B2 | 3/2007 | Motoyama |
| 2002/0007390 | A1 | 1/2002 | Motoyama |
| 2002/0048034 | A1 | 4/2002 | Matoba |
| 2002/0152028 | A1 | 10/2002 | Motoyama et al. |
| 2002/0152235 | A1 | 10/2002 | Motoyama et al. |
| 2002/0152292 | A1 | 10/2002 | Motoyama et al. |
| 2003/0014515 | A1 | 1/2003 | Motoyama et al. |
| 2003/0093522 | A1 | 5/2003 | Motoyama |
| 2005/0015487 | A1 | 1/2005 | Motoyama et al. |
| 2005/0033872 | A1 | 2/2005 | Motoyama |
| 2005/0063367 | A1 | 3/2005 | Motoyama |
| 2005/0165929 | A1 | 7/2005 | Motoyama |
| 2005/0210131 | A1 | 9/2005 | Motoyama et al. |
| 2005/0240939 | A1 | 10/2005 | Motoyama et al. |
| 2005/0246439 | A1 | 11/2005 | Fong et al. |
| 2005/0256934 | A1 | 11/2005 | Motoyama |
| 2006/0031538 | A1 | 2/2006 | Motoyama et al. |
| 2006/0041380 | A1 | 2/2006 | Motoyama et al. |
| 2006/0075097 | A1 | 4/2006 | Motoyama |
| 2006/0101125 | A1 | 5/2006 | Motoyama |
| 2006/0164683 | A1 | 7/2006 | Motoyama et al. |
| 2006/0168063 | A1 | 7/2006 | Motoyama |
| 2006/0168085 | A1 | 7/2006 | Motoyama |
| 2006/0168103 | A1 | 7/2006 | Motoyama et al. |
| 2006/0184633 | A1 | 8/2006 | Motoyama et al. |
| 2007/0027951 | A1 | 2/2007 | Motoyama et al. |
| 2007/0033266 | A1 | 2/2007 | Motoyama et al. |
| 2007/0033267 | A1 | 2/2007 | Motoyama et al. |
| 2007/0033268 | A1 | 2/2007 | Motoyama et al. |
| 2007/0033530 | A1 | 2/2007 | Motoyama et al. |
| 2007/0201496 | A1 | 8/2007 | Motoyama |

FOREIGN PATENT DOCUMENTS

| | | |
|---|---|---|
| EP | 0 504 884 | 9/1992 |
| EP | 1 083 486 | 3/2001 |
| EP | 1 246 069 | 10/2002 |
| EP | 1 294 125 | 3/2003 |
| GB | 2 301 980 | 12/1996 |
| JP | 2-172348 | 7/1990 |
| JP | 09106330 | 4/1997 |
| WO | WO 92/22033 | 12/1992 |

OTHER PUBLICATIONS

U.S. Appl. No. 09/108,705, filed Jul. 1, 1998, Motoyama.
U.S. Appl. No. 09/192,583, filed Nov. 17, 1998, Motoyama.
U.S. Appl. No. 09/393,677, filed Sep. 10, 1999, Motoyama et al.
U.S. Appl. No. 09/440,692, filed Nov. 16, 1999, Motoyama et al.
U.S. Appl. No. 09/440,646, filed Nov. 16, 1999, Motoyama et al.
U.S. Appl. No. 09/440,645, filed Nov. 16, 1999, Fong et al.
U.S. Appl. No. 09/453,934, filed May 17, 2000, Motoyama.
U.S. Appl. No. 09/453,937, filed May 17, 2000, Motoyama et al.
U.S. Appl. No. 09/575,710, filed Jul. 25, 2000, Motoyama et al.
U.S. Appl. No. 10/684,434, filed Oct. 15, 2003, Motoyama et al.
U.S. Appl. No. 10/830,064, filed Apr. 23, 2004, Motoyama et al.
U.S. Appl. No. 11/437,627, filed May 22, 2006, Motoyama et al.
U.S. Appl. No. 11/742,939, filed May 1, 2007, Motoyama.
Internetworking with TCP/IP, Principles, protocols, and Architecture, vol. 1., 3erd ed. Comer, Douglas Mar. 20, 1995.
Newton's Telecom Dictionary, 14th edition, Newton, Harry, Flatiron Publishing Mar. 1998.
Communications and Networking for the PC, Jordan and Churchill, 5th edition, New Riders Publishing 1994.
Patent Abstracts of Japan, vol. 15, No. 326 (E-1102), Aug. 20, 1991, JP 03 123172, May 24, 1991.
Sendmail: An Internetwork Mail Router, E Allman—University of California, Berkeley, 1983.
U.S. Appl. No. 11/940,785, filed Nov. 15, 2007, Motoyama et al.
U.S. Appl. No. 12/015,659, filed Jan. 17, 2008, Motoyama et al.
U.S. Appl. No. 12/029,508, filed Feb. 12, 2008, Motoyama et al.
U.S. Appl. No. 12/028,281, filed Feb. 8, 2008, Motoyama et al.
U.S. Appl. No. 11/873,935, filed Oct. 17, 2007, Motoyama et al.
U.S. Appl. No. 11/935,161, filed Nov. 5, 2007, Motoyama et al.

* cited by examiner

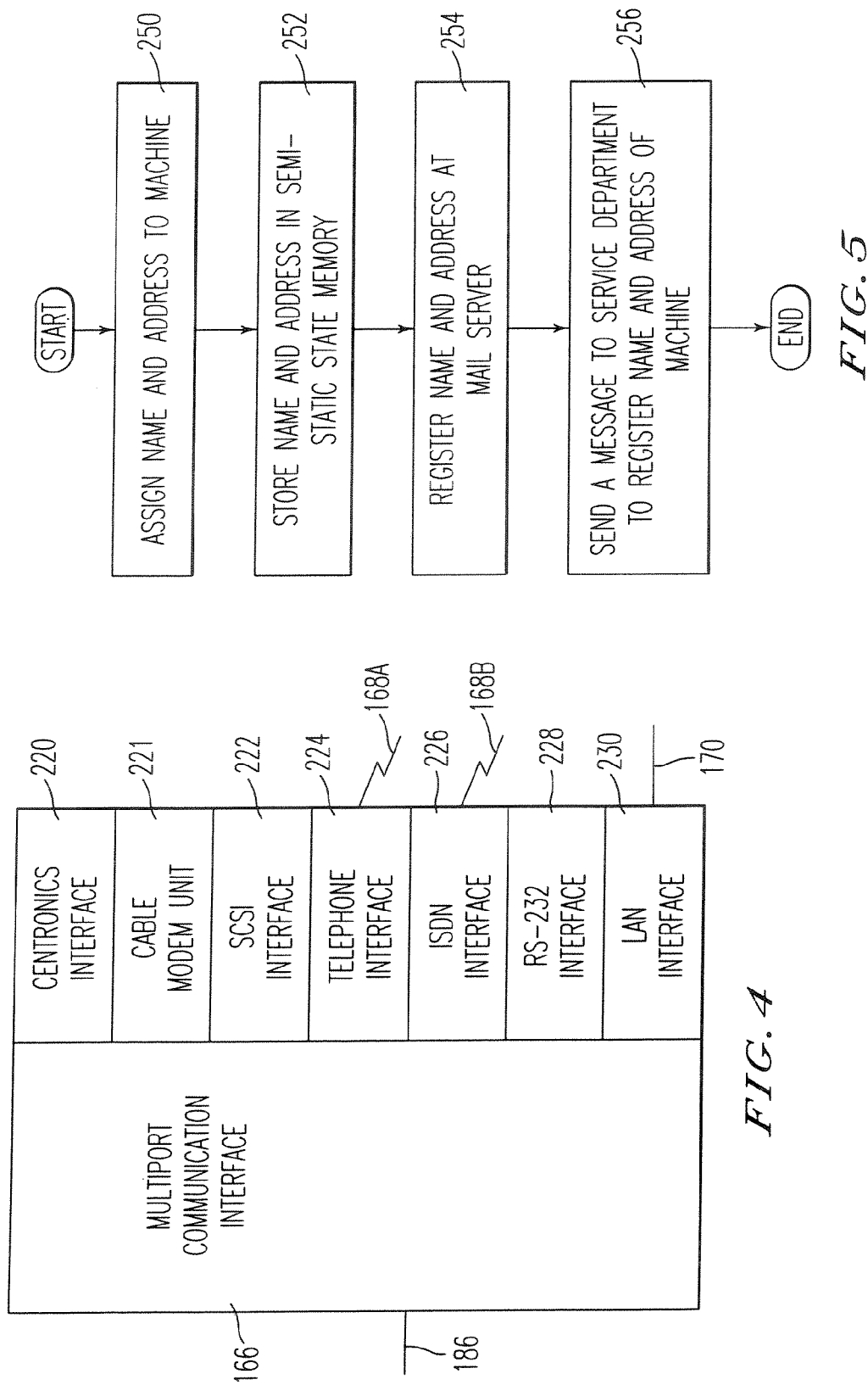

680

```
From Monitored-Device Tue Apr 16 21:09:26 1996
Date: Wed, 17 Apr 1996 13:08:04 +0900
To: Monitoring-Device
From: Monitored-Device
X-Sender: Monitored-Device
Subject: Request
MIME-Version: 1.0
Content-Type: text/plain; charset-"us-ascii"
X-Mailer: XYZ
Status: RO
:$9) '-61'-$%f,QT'C@F15P"&4d49-5!"!!!"BdX!!!!!I)$rf2rE!)3!"J3&"J8
%"JB&"JF("JJ+%!S+#3N+&!i2$"!A&"JB&a3@&KSG*4mD'b-F&KBJ,#!M*LFT+LN
C(bd',5J'*5JT+!%("'F+#!S6#J86+"S@'LJS+#JS+#JS+#JS+#JS+#JS+#JS+#J
S+#JS+#JS+#JS+#JS+#JS+#JS+#JS+#JS+#JSrm!!%3J#3!-!!'%K!!)4!3-4!Ir
%!D)!!!%&!3%"!3%"!!!!!!!!!!!"!J-%"3B(#!N+#'%!!'%"!3%"!3%"!3!!!!!
!!!%#!'3&"JF)#3S,%!!#!3-$!J3$"38%"!!!!Ad"!J-!""%&%L&a33B68@%()R%
```

*FIG. 20*

METHOD AND SYSTEM FOR DIAGNOSIS AND CONTROL OF MACHINES USING CONNECTIONLESS MODES HAVING DELIVERY MONITORING AND AN ALTERNATE COMMUNICATION MODE

CROSS-REFERENCES TO RELATED APPLICATIONS

The present application is a Continuation of and claims the benefit of priority from U.S. Ser. No. 08/883,492, filed Jun. 26, 1997 and is related to U.S. patent application Ser. No. 08/820,633 filed Mar. 19, 1997 (now U.S. Pat. No. 5,887,216) entitled "Method and System to Diagnose a Business Office Device Based on Operating Parameters Set by a User, U.S. patent application Ser. No. 08/733,134 (now U.S. Pat. No. 5,909,493) filed Oct. 16, 1996 entitled "Method and System for Diagnosis and Control of Machines Using Connectionless Modes of Communication, U.S. patent application Ser. No. 08/624,228 (now U.S. Pat. No. 5,818,603) filed Mar. 29, 1996 entitled "Method and System for Controlling and Communicating with Machines Using Multiple Communication Formats", U.S. patent application Ser. No. 08/463,002 (now U.S. Pat. No. 5,819,110) filed Jun. 5, 1995 entitled "Method and System for Diagnosis and Control of Machines Using Connection and Connectionless Modes of Communication", U.S. patent application Ser. No. 08/698,068 (now U.S. Pat. No. 5,649,120) filed Aug. 15, 1996 entitled "Method and Apparatus for Controlling and Communicating With Business Office Devices", which is a continuation of U.S. patent application Ser. No. 08/562,192 (now U.S. Pat. No. 5,568,618) filed Nov. 22, 1995, which is a continuation of U.S. patent application Ser. No. 08/473,780 filed Jun. 6, 1995, entitled "Method and Apparatus for Controlling and Communicating With Business Office Devices", now U.S. Pat. No. 5,544,289, which is a continuation of U.S. patent application Ser. No. 08/426,679 filed Apr. 24, 1995, now U.S. Pat. No. 5,537,554, entitled "Method and Apparatus for Controlling and Communicating With Business Office Devices" which is a continuation of U.S. Patent Application Ser. No. 08/282,168 filed Jul. 28, 1994 and entitled "Method and Apparatus for Controlling and Communicating With Business Office Devices", now U.S. Pat. No. 5,412,779, which is a continuation of U.S. Patent Application Ser. No. 07/902,462 filed Jun. 19, 1992, now abandoned, which is a continuation of U.S. Patent Application Ser. No. 07/549,278, filed Jul. 6, 1990, now abandoned, the disclosure of each is incorporated herein by reference.

BACKGROUND OF THE INVENTION

1. Field of the Invention

The present invention is related to the remote monitoring, diagnosis and control of machines using connection and connectionless modes of communication and is more particularly related to monitoring, the control and diagnosis of business office machines such as copiers, printers, and facsimile machines.

The invention is further related to assuring that outgoing connectionless communications are received by the appropriate entity and attempting communication using an alternate mode if a connectionless communication is not received.

2. Discussion of the Background

U.S. Pat. No. 5,412,779 discloses the controlling of business office devices by a remote diagnostic station. However, the method of communication in this system and other known systems for controlling machines such as business office machines is to establish a connection between the machine and the diagnostic station and to use a connection-mode of communication.

The use of a dedicated communication connection between the machine and diagnostic station is more expensive as compared to the use of the Internet. On the other hand, the Internet has disadvantages in that some forms of communication over the Internet are slow and may be delayed, and have a problem in that the Internet is not a secure mode of transmission (i.e., communications may be monitored by others). Further, because of the nature of the Internet, electronic mail communications transmitted over the Internet do not always reach their intended destinations. In addition, the connection-mode access to an installed machine from the Internet may not be possible because of a security block by a firewall. However, even with the delays of a connectionless-mode of communication over the Internet, the inventor has found that the Internet can still provide a suitable medium for communication for some applications.

SUMMARY OF THE INVENTION

Accordingly, it is one object of the invention to provide a connectionless-mode of transmission between a machine and a remote diagnostic station. It is a further object of the invention to provide a method and system to assure that outgoing connectionless communications are properly received, and when not received, to use an alternate mode of communication.

These and other objects are accomplished by a method and system of communicating. Initially, a device transmits a connectionless-mode message such as an electronic mail message to a receiving device. The connectionless-mode message includes a message ID, an indication of whether a reply to the message is requested, an indication of the urgency level of the reply, and the message contents. The message preferably includes some type of time stamp or other unique identifier which is used to differentiate messages. According to the preferred embodiment, the message ID is created based on the time and date the message is created or transmitted.

In addition to providing the capability of a request for a reply to a message, replies may be requested, if desired, for individual commands or operators contained within the message. The operators within the message may be constructed to include the operator name, one or more parameters of the operator, whether a reply is requested for the operator, the urgency level of the reply for the operator, and an operation request ID. The operation request ID is included for the purpose of allowing the same operator to be included in a message a plurality of times. Thus, specific operators can be identified by indicating the message ID corresponding to the message containing the operator along with the operation request ID corresponding to the operator. As an example of how the operation request ID operates, the first time an operator is used in a message, its operation request ID is set to one. Subsequent uses of the same operator are assigned the next sequential number for that operator such as two, three, etc. The invention allows an inquire operation to be transmitted in order to determine the status of an operation which was requested to be performed.

The connectionless-mode messages used with the present invention are preferably electronic mail messages. The message body preferably contains the content of the message, although it is possible for the header of the message to contain some information. According to the preferred embodiment, the message body is transmitted in a textual representation of a binary message. In order to assure that the binary message is properly communicated, the binary message may be converted to a textual format in a known manner such as through the known uuencode operation.

If an acknowledgment of the receipt or processing of the connectionless-mode of operation has not been received, the original transmitting device may again attempt to communicate the message using a connection-mode of operation such as by using a modem connection over a telephone line, an ISDN line, or cable. Alternatively, a message may be displayed to a user indicating that an acknowledgment was not received. If the message originates from a business office device such as a copier, an operation panel of the copier may display a message indicating that the message was not received and it is desirable to call the service center of the copier.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 illustrates details of the multi-port communication interface illustrated in FIG. 3;

FIG. 5 illustrates a process performed when a machine is initially installed;

FIG. 20 illustrates an exemplary electronic mail message utilized in the connectionless-mode operation of the invention;

FIGS. 21A and 22B illustrate the process of constructing a message which is to be transmitted;

DESCRIPTION OF THE PREFERRED EMBODIMENTS

Figure 1:
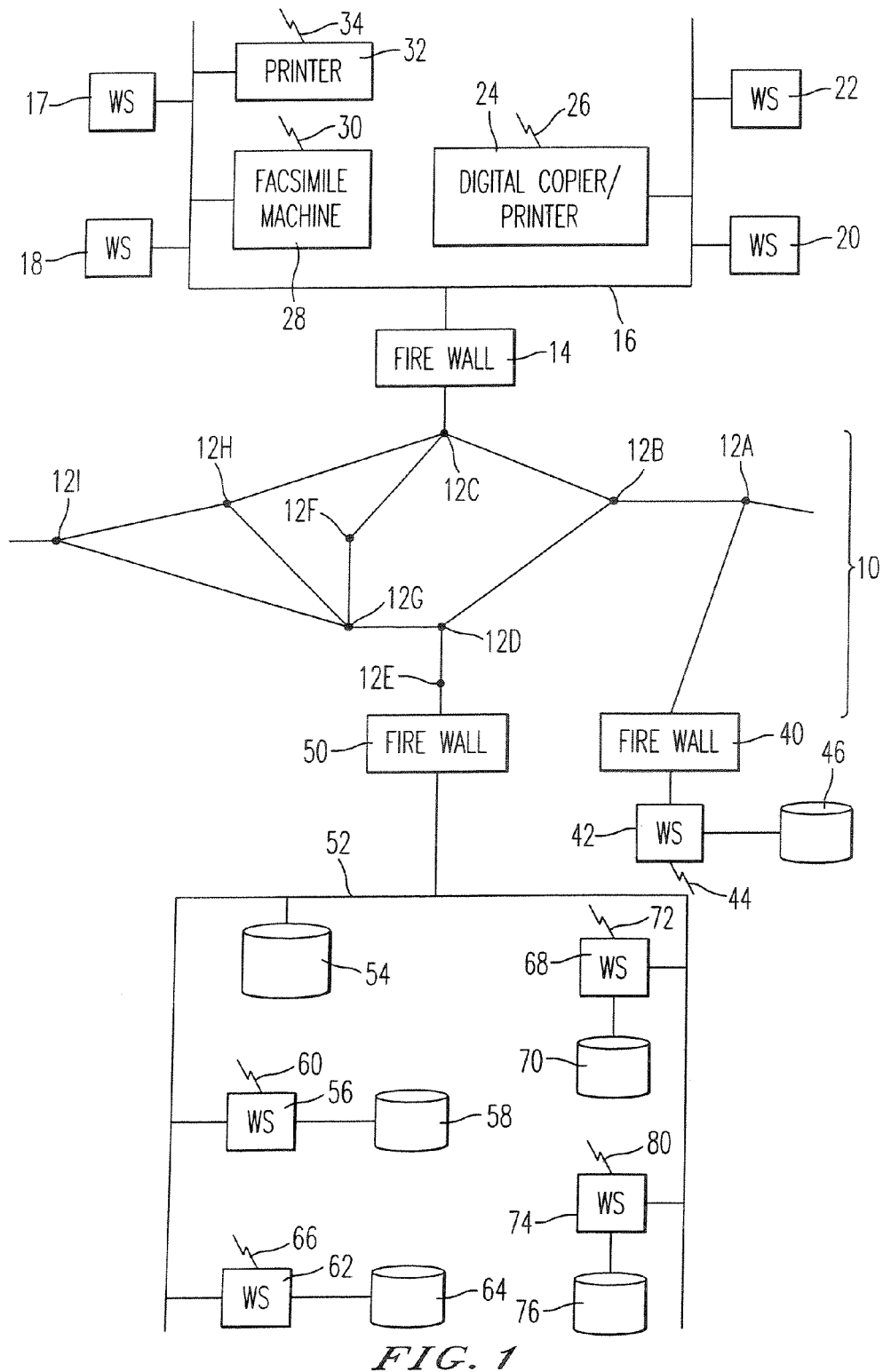
FIG. 1 illustrates three networked business office machines connected to a network of computers and data bases through the Internet.

Referring now to the drawings, wherein like numerals designate identical or corresponding parts throughout the several views, and more particularly to FIG. 1 thereof, there is illustrated a figure showing various machines and computers for monitoring, diagnosing and controlling the operation of the machines. In FIG. 1, there is a first network 16, such as a Local Area Network (LAN) connected to computer workstations 17, 18, 20 and 22. The workstations can be any type of computers including IBM Personal Computer compatible devices, Unix Based Computers, or Apple Macintoshes. Also connected to the network 16 are a digital copier/printer 24, a facsimile machine 28, and a printer 32. The devices 24, 28 and 32 are referred to as machines or monitored devices and other types of devices may be used as the machines or monitored devices. Also, a facsimile server (not illustrated) may be connected to the network 16 and have a telephone, ISDN (Integrated Services Digital Network), or cable connection. In addition to the digital copier/printer 24, facsimile machine 28, and printer 32 being connected to the network 16, these devices may also include conventional telephone and/or ISDN and/or cable connections 26, 30 and 34, respectively. As is explained below, the business office machines or business devices 24, 28 and 32 communicate with a remote monitoring, diagnosis and control station, also referred to as a monitoring device, through the Internet via the network 16 or by a direct telephone, ISDN, or cable connection.

In FIG. 1, the Internet is generally designated by 10. The Internet 10 includes a plurality of interconnected computers and routers designated by 12A-12B. The manner of communicating over the Internet is known through RFC documents obtained by FTP at NIC.DDN.MIL or at FTP NISC.SRI.COM. TCP/IP related communication is described for example in the book "TCP/IP Illustrated," Vol. 1, The Protocols, by Stevens, from Addison-Wesley Publishing Company, 1994. As the Internet is a network accessible by many people and organizations, it is not considered to be secure. Therefore, messages transmitted over the Internet should be encrypted to keep the messages confidential. Encryption mechanisms are known and commercially available which may be used with the present invention. For example, a C library function, crypt( ), is available from Sun Microcomputers for use with the Unix operating system, and other encryption and decryption routines are known and commercially available.

An additional security measure used in connecting a computer network to the Internet is a protective device known as a firewall. This device allows only authorized computers to access a network or other computer via the Internet. Firewalls are known and commercially available devices and, for example, include SunScreen from Sun Microsystems Inc.

In FIG. 1, a firewall 14 is connected between the Internet 10 and the network 16. Similarly, a firewall 50 is connected between the Internet 10 and a network 52. Also, a firewall 40 is connected between the Internet 10 and a workstation 42.

The network 52 is a conventional network and includes a plurality of workstations 56, 62, 68 and 74. These workstations may be different departments within a company such as a marketing, manufacturing, design engineering and customer service departments. In addition to the workstations connected via the network 52, there is a workstation 42 which is not directly connected to the network 52. Information in a data base stored in a disk 46 may be shared using proper encryption and protocols over the Internet to the workstations connected directly to the network 52. Also, the workstation 42 includes a direct connection to a telephone line and/or ISDN and/or cable 44 and the data base in disk 46 may be accessed through the telephone line, ISDN, or cable. The cable used by this invention may be implemented using a cable which typically is used to carry television programming, cable which provides for high speed communication of digital data typically used with computers or the like, or may be implemented using any desired type of cable.

Information of the business office machines 24, 28 and 32 may be stored in one or more of the data bases stored in the disks 46, 54, 58, 64, 70 and 76. Each of the customer service, marketing, manufacturing, and engineering departments may have their own data base or may share from one or more data bases. Each of the disks used to store data bases is a non-volatile memory such as a hard disk or optical disk. As an example, disk 64 contains the marketing data base, disk 58 contains the manufacturing data base, disk 70 contains the engineering data base and disk 76 contains the customer service data base. Alternatively, the disks 54 and 46 store one or more of the data bases.

In addition to the workstations 56, 62, 68, 74 and 42 being connected to the Internet, these workstations may also include a connection to a telephone line, ISDN, or cable which provides a secure connection to the machine being monitored diagnosed and/or controlled and is used during a connection-mode of communication. Additionally, if one of the Internet, and telephone, ISDN, or cable is not operating properly, one of the others can be automatically used for communication.

An important feature of the present invention is the use of a connectionless-mode of communication or transmission between a machine and a computer for diagnosing and controlling the machine. The IBM Dictionary of Computing by George McDaniel, 1994, defines a connectionless-mode transmission to be the transmission of a single unit of data from a source service access point to one or more destination service access points without establishing a connection. The IBM Dictionary also defines a connection-mode transmission to be the transmission of units of data from a source service access point to one or more destination service access points via a connection. The connection is established prior to data transfer and released following data transfer. Additional information about the connection-mode and the connectionless-mode of operation is described in the Handbook of Computer-Communications Standards, Vol. 1, 2nd Edition, by William Stallings, 1990, which is incorporated herein by reference. In order to transfer data from one DTE (data terminal equipment) to another DTE, there is a unique identifier or address for each DTE. This unique identifier or address is usable in both connectionless-modes and connectionless-modes of communication.

Figure 2:
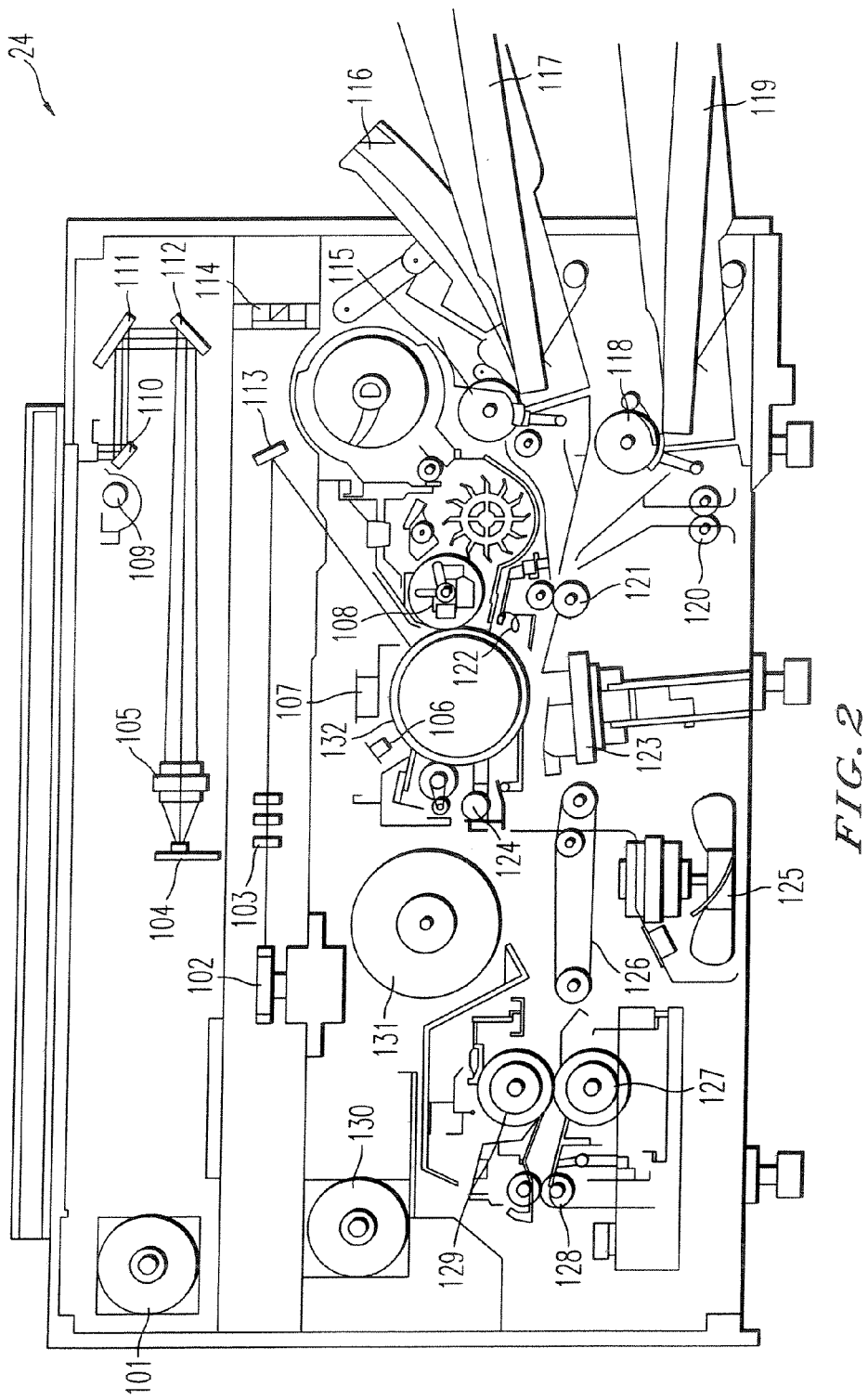
FIG. 2 illustrates the components of a digital copier/printer.

FIG. 2 illustrates the mechanical layout of the digital copier/printer 24 illustrated in FIG. 1. In FIG. 2, 101 is a fan for the scanner, 102 is a polygonal mirror used with a laser printer, and 103 designates an FE lens used to collimate light from a laser (not illustrated). Reference numeral 104 designates a sensor for detecting light from the scanner, 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illustrate a document to be scanned and 110, 111 and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital copier/printer, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller, 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital copier.

Figure 3:
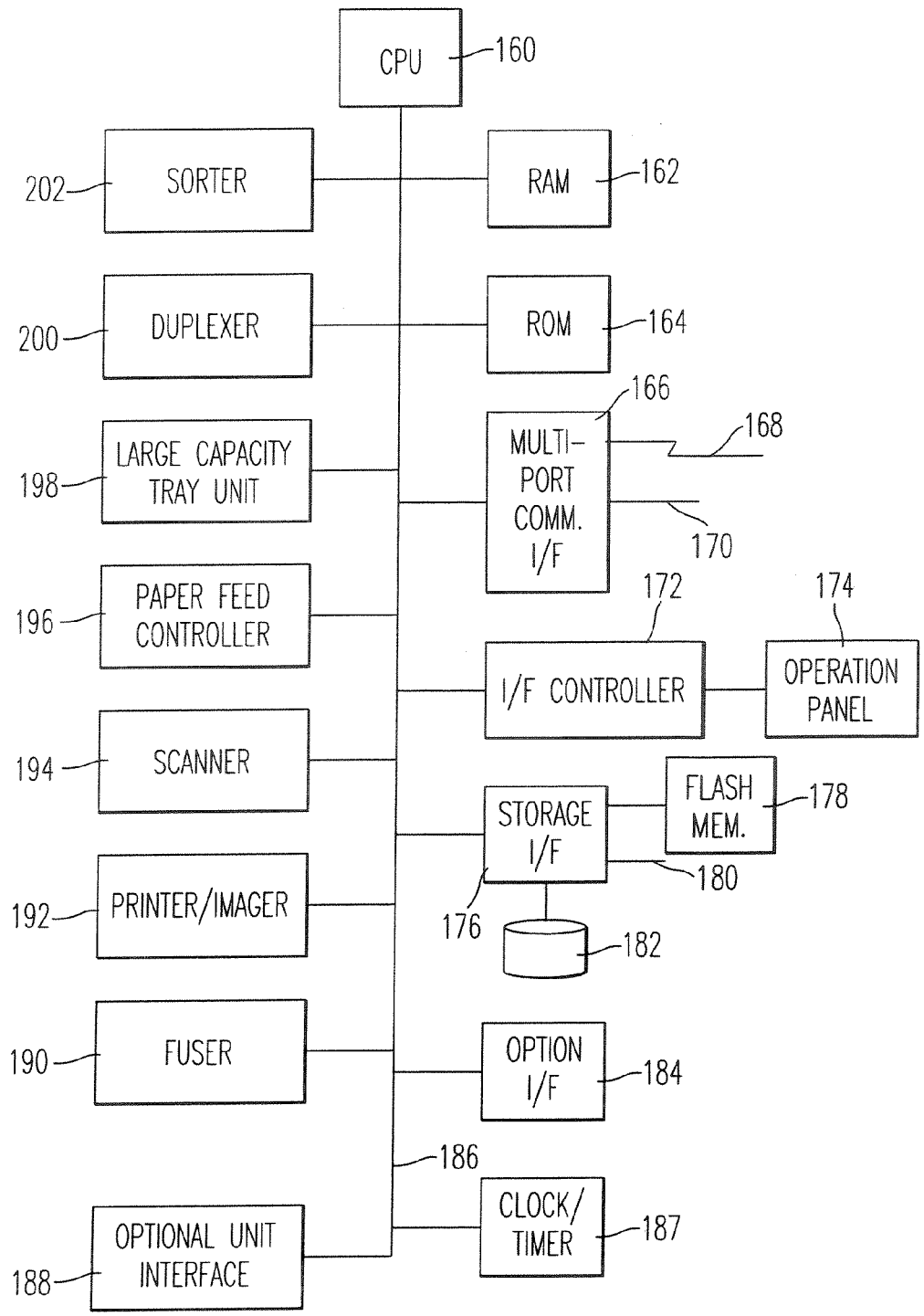
FIG. 3 illustrates electronic components of the digital copier/printer illustrated in FIG. 2.

FIG. 3 illustrates a block diagram of the electronic components illustrated in FIG. 2. The CPU 160 is a microprocessor and acts as the system controller. There is a random access memory 162 to store dynamically changing information including operating parameters of the digital copier. A read only memory 164 stores the program code used to run the digital copier and also information describing the copier (static-state data) such as the model number and serial number of the copier.

There is a multi-port communication interface 166 which allows the digital copier to communicate with external devices. Reference numeral 168 represents a telephone, ISDN, or cable line and 170 represents a network. Further information of the multi-port communication interface is described with respect to FIG. 4. An interface controller 172 is used to connect an operation panel 174 to a system bus 186. The operation panel 174 includes standard input and output devices found on a digital copier including a copy button, keys to control the operation of the copier such as number of copies, reducement/enlargement, darkness/lightness, etc. Additionally, a liquid crystal display is included within the operation panel 174 to display parameters and messages of the digital copier to a user.

A storage interface 176 connects storage devices to the system bus 186. The storage devices include a flash memory 178 which can be substituted by a conventional EEPROM and a disk 182. The disk 182 includes a hard disk, optical disk, and/or a floppy disk drive. There is a connection 180 connected to the storage interface 176 which allows for additional memory devices to be connected to the digital copier. The flash memory 178 is used to store semi-static state data which describes parameters of the digital copier which infrequently change over the life of the copier. Such parameters include the options and configuration of the digital copier. An option interface 184 allows additional hardware such as an external interface to be connected to the digital copier. A clock/timer 187 is utilized to keep track of both the time and date and also to measure elapsed time.

On the left side of FIG. 3, the various sections making up the digital copier are illustrated. Reference numeral 202 designates a sorter and contains sensors and actuators used to sort the output of the digital copier. There is a duplexer 200 which allows a duplex operation to be performed by the digital copier and includes conventional sensors and actuators. The digital copier includes a large capacity-tray unit 198 which allows paper trays holding a large number of sheets to be used with the digital copier. The large capacity tray unit 198 includes conventional sensors and actuators.

A paper feed controller 196 is used to control the operation of feeding paper into and through the digital copier. A scanner 191 is used to scan images into the digital copier and includes conventional scanning elements such as a light, mirror, etc. Additionally, scanner sensors are used such as a home position sensor to determine that the scanner is in the home position and a lamp thermistor to ensure proper operation of the scanning lamp. There is a printer/image 192 which prints the output of the digital copier and includes a conventional laser printing mechanism, a toner sensor, and an image density sensor. The fuser is used to fuse the toner onto the page using a high temperature roller and includes an exit sensor, a thermistor to assure that the fuser is not overheating, and an oil sensor. Additionally, there is an optional unit interface 188 used to connect to optional elements of the digital copier such as an automatic document feeder, a different type of sorter/collator, or other elements which can be added to the digital copier.

FIG. 4 illustrates details of the multi-port communication interface 166. The digital copier may communicate to external devices through a Centronics interface 220 which receives or transmits information to be printed, a cable modem unit 221 which has a high speed connection over cable, a SCSI interface 222, a conventional telephone interface 224 which connects to a telephone line 168A, an ISDN interface 226 which connects to an ISDN line 168B, an RS-232 interface 228, and a LAN interface 230 which connects to a LAN 170. A single device which connects to both a Local Area Network and a telephone line is commercially available from Megahertz and is known as the Ethernet-Modem.

The CPU or other microprocessor or circuitry executes a monitoring process to monitor the state of each of the sensors of the digital copier, and a sequencing process is used to execute the instructions of the code used to control and operate the digital copier. Additionally, there is a central system control process executed to control the overall operation of the digital copier and a communication process used to assure reliable communication to external devices connected to the digital copier. The system control process monitors and controls data storage in a static state memory such as the ROM 164 of FIG. 3, a semi-static memory such as the flash memory 178 or disk 182, or the dynamic state data which is stored in a volatile or non-volatile memory such as the RAM 162 or the flash memory or disk 182. Additionally, the static state data may be stored in a device other than the ROM 164 such as a non-volatile memory including either of the flash memory 178 or disk 182.

The above details have been described with respect to a digital copier but the present invention is equally applicable to other business office machines such as a facsimile machine, a scanner, a printer, a facsimile server, or other business office machines. Additionally, the present invention includes other types of machines which operate using a connection-mode or connectionless-mode of communication such as a metering system including a gas, water, or electricity metering system, vending machines, or any other device which performs mechanical operations, has a need to be monitored, and performs a function. In addition to monitoring special purpose machines, and computers, the invention can be used to monitor, control, and diagnose a general purpose computer.

FIG. 5 illustrates a flowchart containing a process which is performed for a new machine such as a business office device in order to have it properly recognized by diagnostic, monitoring, and control equipment. After starting, step 250 has a user or device assign a name and address to the machine. In order for the device to transmit or receive communications, it is necessary to know where to send the communication and from where the communication originates. Step 252 stores the name and address in the semi-static state memory such as the flash memory 178 or the disk 182 illustrated in FIG. 3. This information is used both for a connection-mode of communication via a telephone, ISDN, or cable line, a connectionless-mode of communication such as using a conventional Internet electronic mail protocol, and also to have communication to the machine for ordinary purposes such as using the digital copier/printer for printing jobs via the local area network.

Once the information for the machine has been determined and then stored in step 252, it is necessary to register this information so that other devices will be able to access the machine. Therefore, the name and address of this device are registered in a mail server, for example, which will send and receive electronic mail for the network to which the mail server is connected. It is also desirable to register the machine as part of the local area network. Further, the monitoring devices to which the machine transmits messages are registered with the machine. Last, the machine is registered with a computer of a customer service department or other remote monitoring, controlling and/or diagnosing computer in order for the remote device to properly monitor and be aware of the existence of the machine. Step 256 sends a message to a service department or one of the other divisions illustrated in FIG. 1 in order to register the name, address, model number, serial number, or other information and capabilities of the machine in the customer service or another type of data base.

Figure 6:
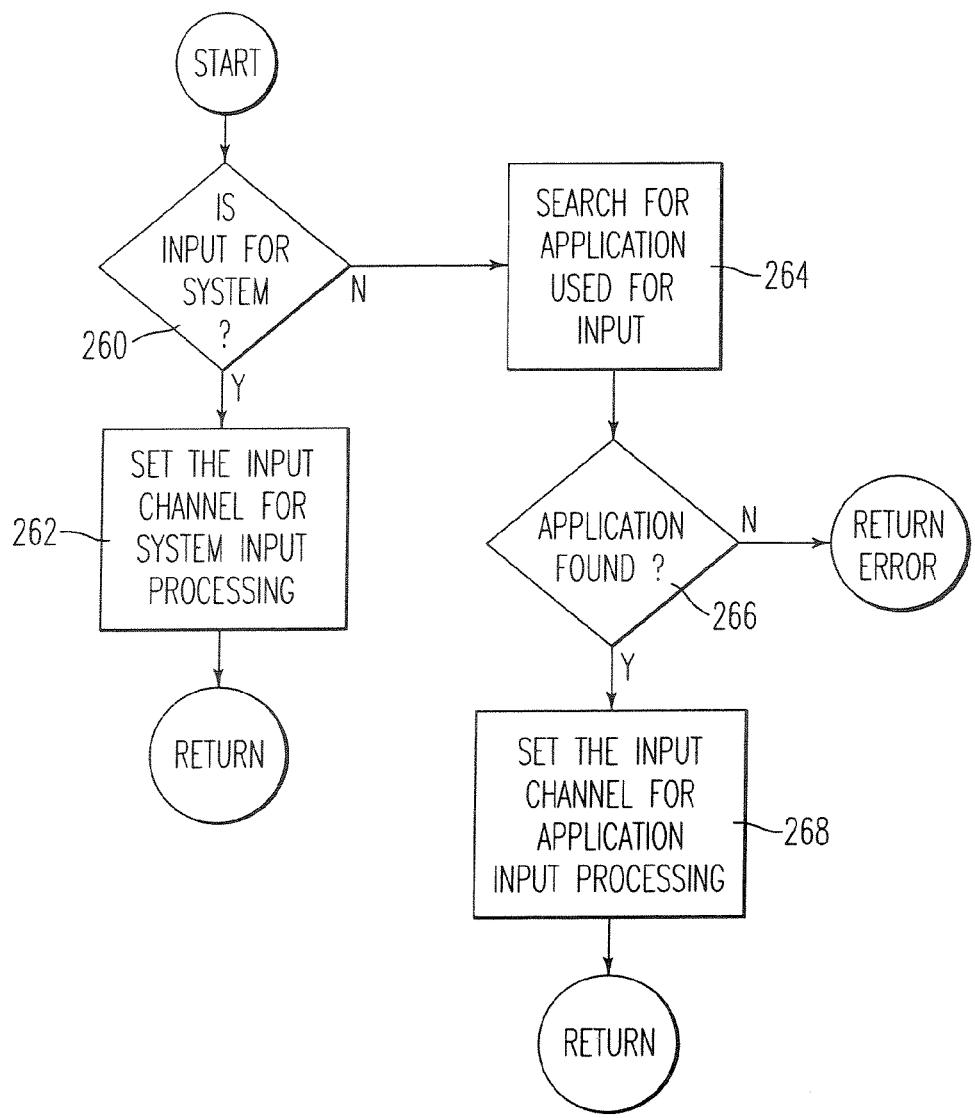
FIG. 6 illustrates a process for determining whether an incoming communication to the machine requires ordinary action or is for remote monitoring, diagnosis and control.

FIG. 6 illustrates a flowchart for determining the source of communication to the machine such as a business office device. After starting, step 260 determines if the input is for a system operation, or alternatively for a diagnosis, monitoring, or remote control operation. If the input is determined to be for the system in step 260, step 262 sets the input channel for ordinary system input processing. For example, if the machine were a printer, the received information would be used to produce a print job. If step 260 determines that the input is not for the system but for control, monitoring, or diagnosis of the machine, step 264 searches for an appropriate application for the input. A typical application would be a process for monitoring or testing of the machine. Step 266 examines if the application which was searched for is found and if it was not, an error is indicated. Otherwise, step 268 sets the input channel for the application input processing and the system is ready to process the incoming information.

Figure 7:
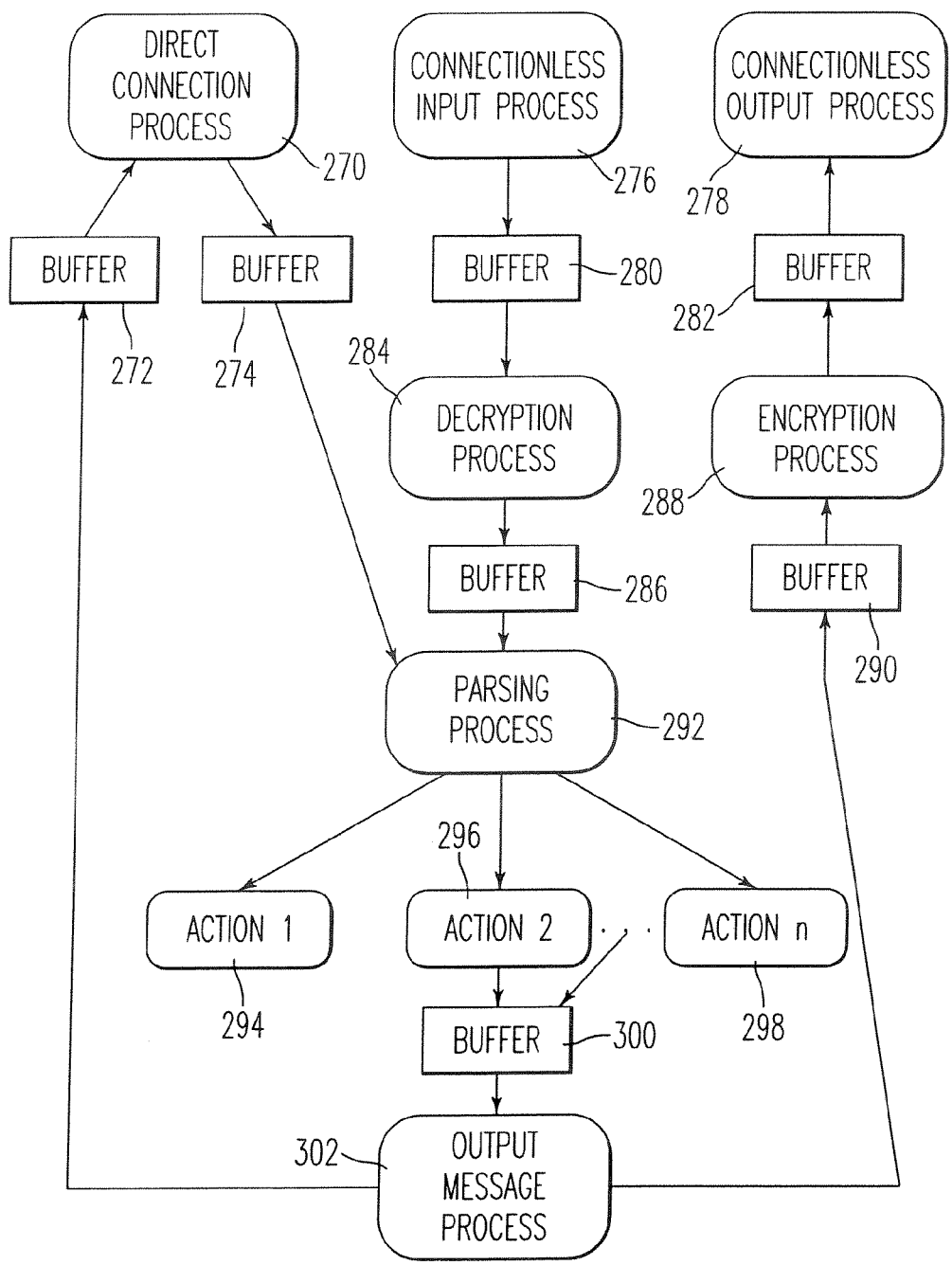
FIG. 7 is a data flow diagram of communications to and from the machine.

FIG. 7 illustrates a data flow diagram which processes incoming messages to and outgoing messages from a machine such as the digital copier/printer. A direct connection process 270 is used to process incoming and outgoing communications in a connection-mode of communication such as through a local area network, telephone line, ISDN line, or cable. Incoming messages pass through buffer 274 to a parsing process 292 which performs parsing of incoming information in a known and conventional manner. The incoming information causes various actions such as the actions illustrated in 294, 296 and 298 to occur. Some actions require that a message be returned and the returned message is illustrated by the arrows leading to buffer 300. An output message process is performed which prepares an outgoing message to either the direct connection or connectionless process. The direct connection process passes through buffer 272 before passing through the direct connection process 270.

For a connectionless-mode of communication, there is a connectionless input process 276 and a connectionless output process 278. Incoming connectionless-mode communications pass through buffer 280 and a decryption process is performed in step 284. The decrypted information is stored in buffer 286 and passed to a conventional parsing process 292. As explained above, one or more of the actions 294, 296 and 298 are performed and outgoing messages pass through the buffer 300 to the output message process 302. Then, the connectionless-mode outgoing messages pass through a buffer 290, after which they are encrypted by the encryption process 288. The encrypted messages then pass through buffer 282 and are transmitted via the connectionless output process 278 over a connectionless network such as the Internet to their final destination.

Any type of a connectionless-mode of communication may be used by the present invention. An inexpensive and readily available medium through which connectionless messages may pass is the Internet processing electronic mail messages. The connectionless input and output processes may be according to any known Internet e-mail protocol such as used by the BSD Unix mail system which is incorporated into the SunOS 4.1.X. Also, other information describing Internet e-mail operations are readily available through various sources on the Internet itself. While the Internet provides an inexpensive manner of a connectionless-mode of communication, the Internet electronic mail system may be slow or unreliable and therefore, in certain circumstances, instead of using a connectionless process, a direct connection process as described below, is performed.

Figure 8:
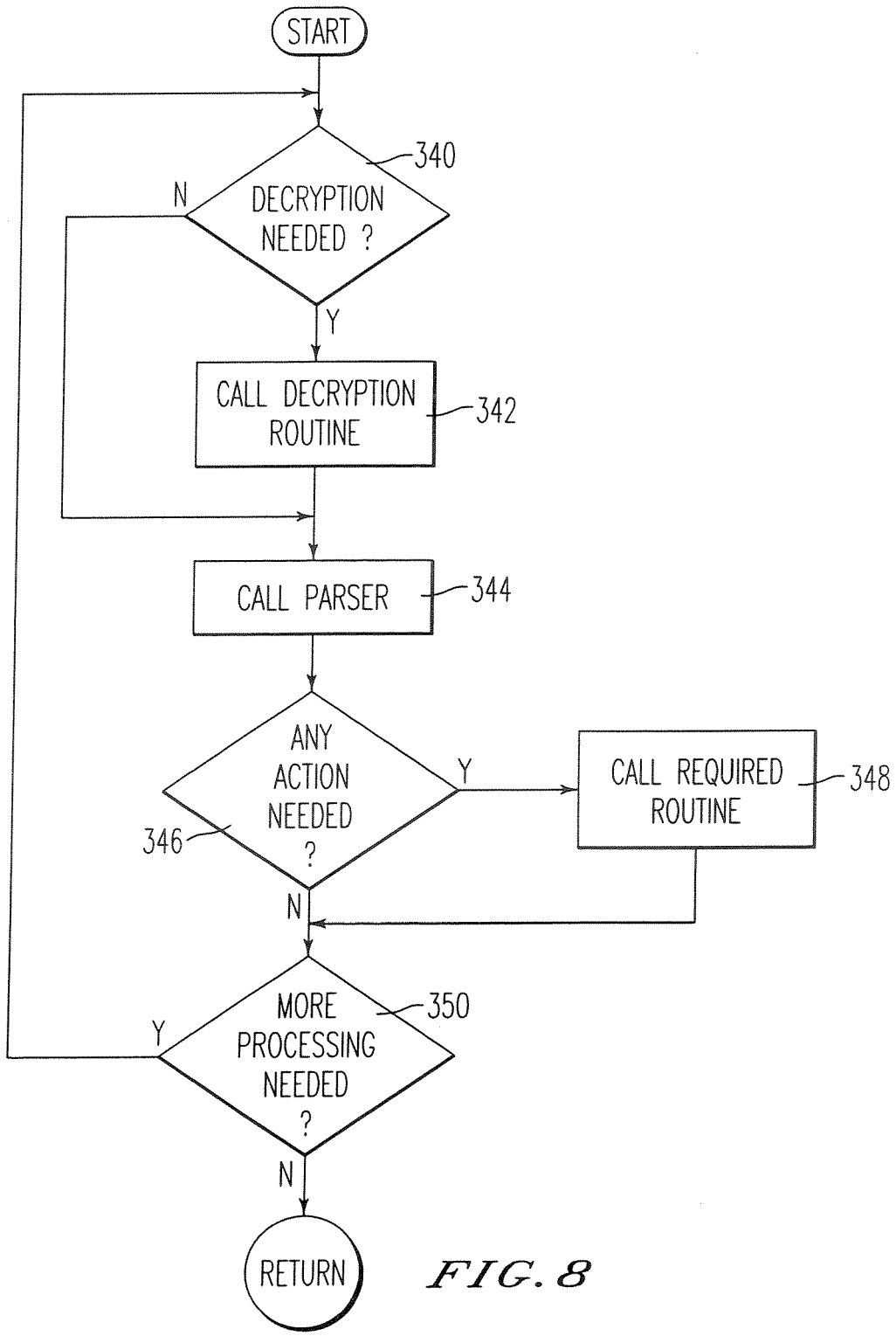
FIG. 8 is a flowchart illustrating the process of the data flow diagram of FIG. 7.

FIG. 8 illustrates a flowchart which may be used to implement the data flow diagram illustrated in FIG. 7. After starting, step 340 determines if decryption is needed and if it is, a decryption routine is performed in step 342. Step 344 then calls a parser which parses in a conventional manner and step 346 determines if any action needs to be taken. If it does, for example when information is to be transmitted back to the remote monitoring, diagnosis, or control device, step 348 calls the required routine. Step 350 determines if more processing is needed and flow returns back to step 340 for further processing. Otherwise, flow returns to the calling process.

Figure 9:
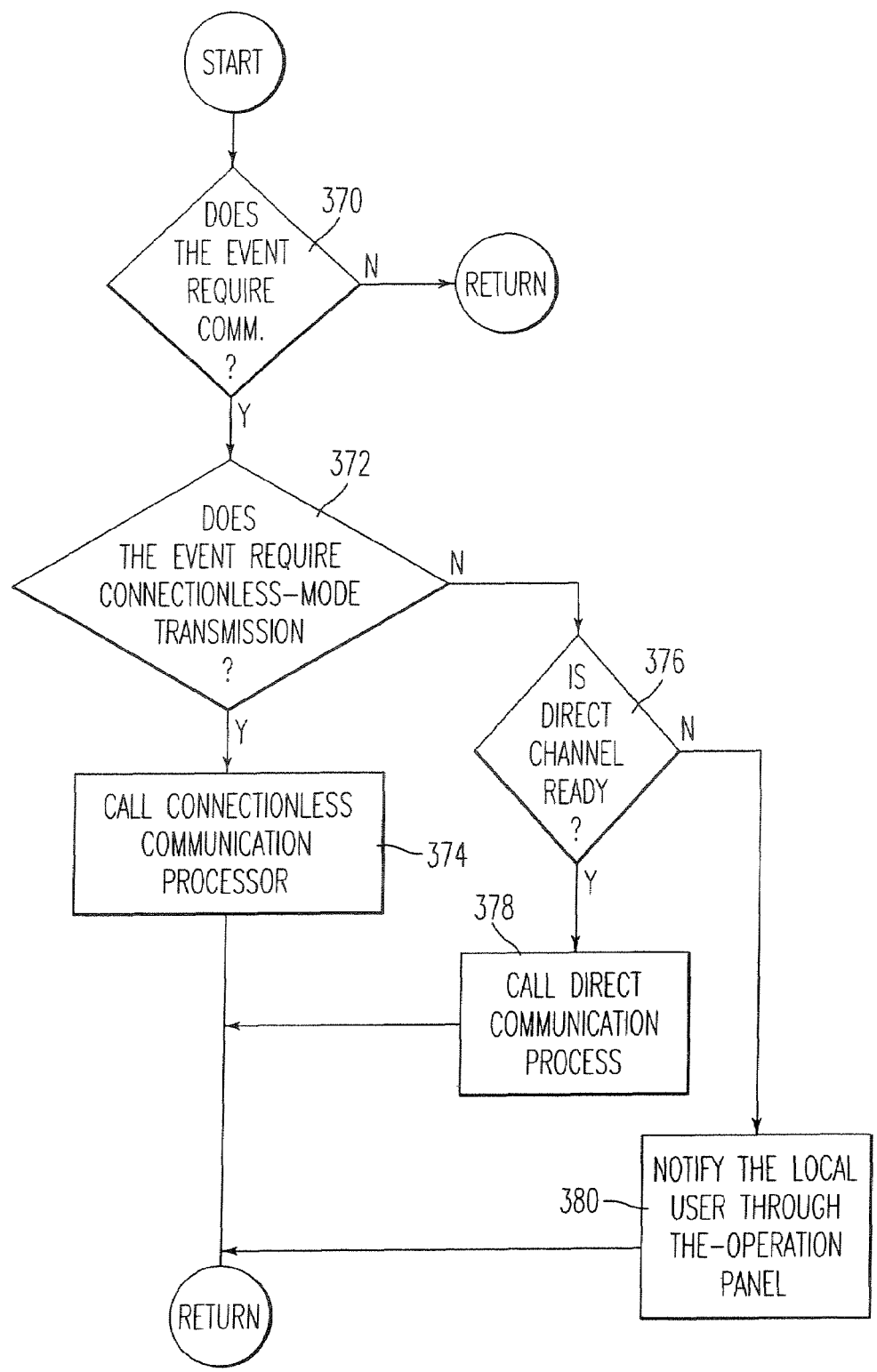
FIG. 9 is a flowchart illustrating the processing performed when communication is initiated by the machine.

FIG. 9 illustrates a process performed within the machine which determines whether a connection-mode or a connectionless-mode of communication is needed. After starting, step 370 determines if an event requires communication and if it does not, flow returns to the calling process. If communication is needed, step 372 determines whether the event requires a connectionless-mode or a connection-mode of transmission. Any type of high priority event for which immediate attention is needed or which the remote monitoring device would be interested in on an expedited basis is sent in a connection-mode of communication. This may be used when a hazardous condition exists within the machine or when something in the machine needs immediate attention. For example, if a thermistor in the fuser unit senses a high and unsafe temperature, a direct connection mode may be used. However, the transmission of a weekly or monthly report indicating the usage and a normal condition state in the machine can use the slower connectionless-mode of communication. Additionally, when the connectionless mode of communication is not properly functioning, the connection-mode of communication is used. For example, if an Internet e-mail message is not properly received by the monitoring device, a direct connection-mode of communication is used. The e-mail message may contain a request for acknowledgment of receipt and if an acknowledgment is not received within a predetermined time (e.g. 3-24 hours) then a connection-mode communication is used to re-transmit the message. Also, if a connection-mode of communication is not properly functioning, then the connectionless-mode of communication may be used.

If step 372 determines that an event does not require a connectionless-mode of communication, step 376 determines if the direct communication channel is ready. For example, it determines if the telephone line, ISDN line, or cable is available. If it is, a direct communication process is performed in step 378 to transmit the appropriate information. If the direct channel is not ready, step 380 notifies the user through the operation panel that there is a problem with the telephone, ISDN, or other direct connection device or communication medium. If step 372 determines that the event requires a connectionless-mode of transmission, step 374 calls a connectionless communication process. The process of FIG. 9 then returns to the calling process.

Figure 10:
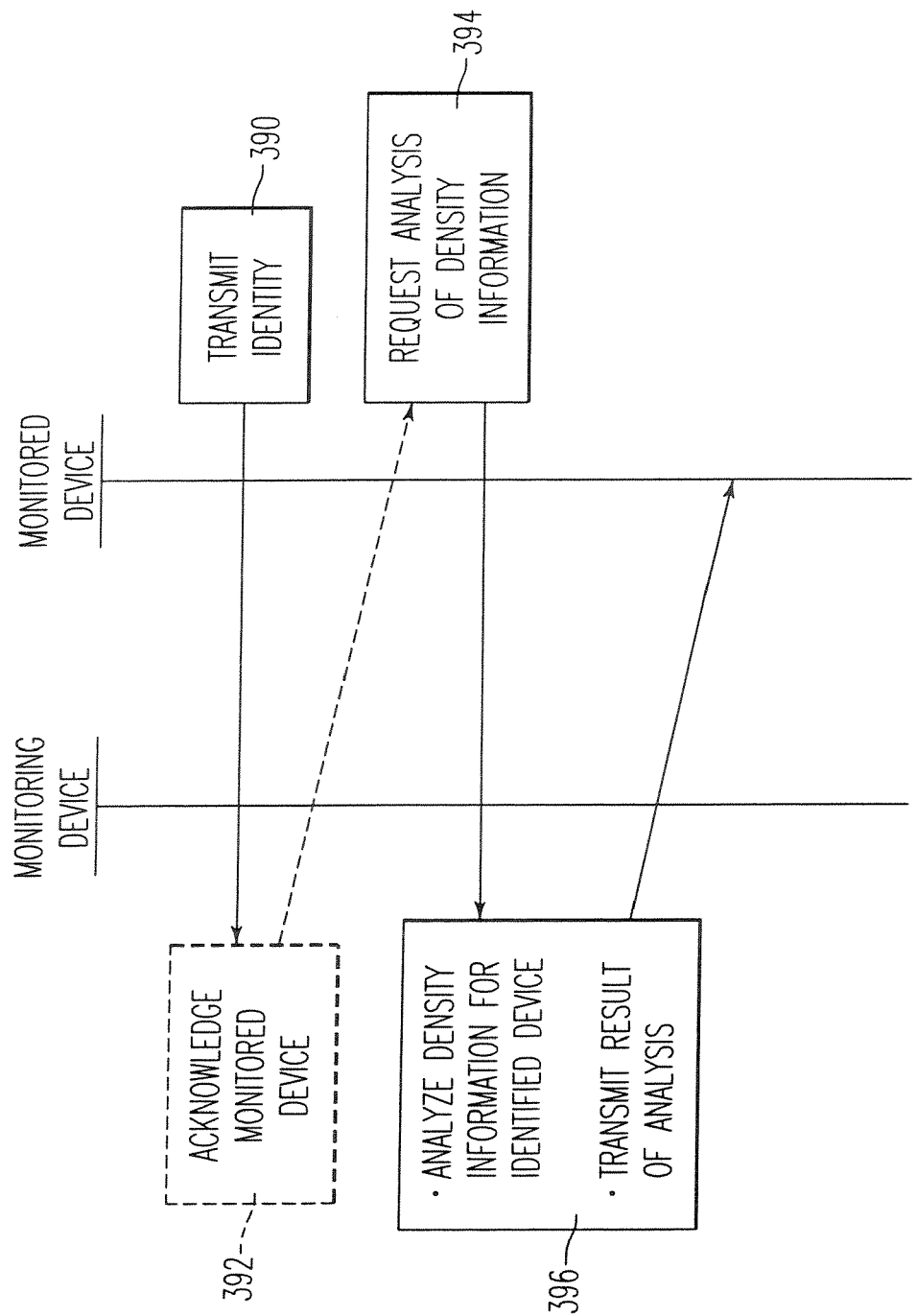
FIG. 10 illustrates connectionless communication from the machine to the remote monitoring device.

FIG. 10 illustrates a connectionless-mode of communication initiated by the machine which is being remotely diagnosed, controlled, and monitored. Initially, the monitored device transmits its identity in step 390. The monitored device then requests an analysis of the density information of the digital copier in step 394. The monitoring device analyzes the density information for the specific digital copier corresponding to the transmitted identity in order to determine if the print density of the digital copier is too dark or too light. Step 396 then transmits the results of the density analysis back to the monitored device. If the process of FIG. 10 used a connection-mode of communication, the monitoring device would execute step 392 which acknowledged receipt of the identity information and step 394 would not be performed until the acknowledgment was received. However, in a connectionless-mode of communication, step 392 is not performed and the transmission of the identity would be immediately followed by the request for analysis, possibly in the same message.

As with the business office machine, the remote device for controlling, diagnosing, and monitoring the machine may initiate either a connection-mode or connectionless-mode of communication. As with the machine, when the remote monitoring device needs to send urgent information or needs an urgent response from the machine, a connection-mode of communication is used. When time is not critical, the remote device may use a connectionless-mode of communication. For example, if new control software needs to be downloaded to the business office machine due to a bug in the program in the business office machine which causes a dangerous condition, a direct connection-mode of communication will be used. Also, as described with respect to the monitored device, if the monitoring device experiences a problem with one of the modes of communication, one of the other modes may be used.

Figure 11:
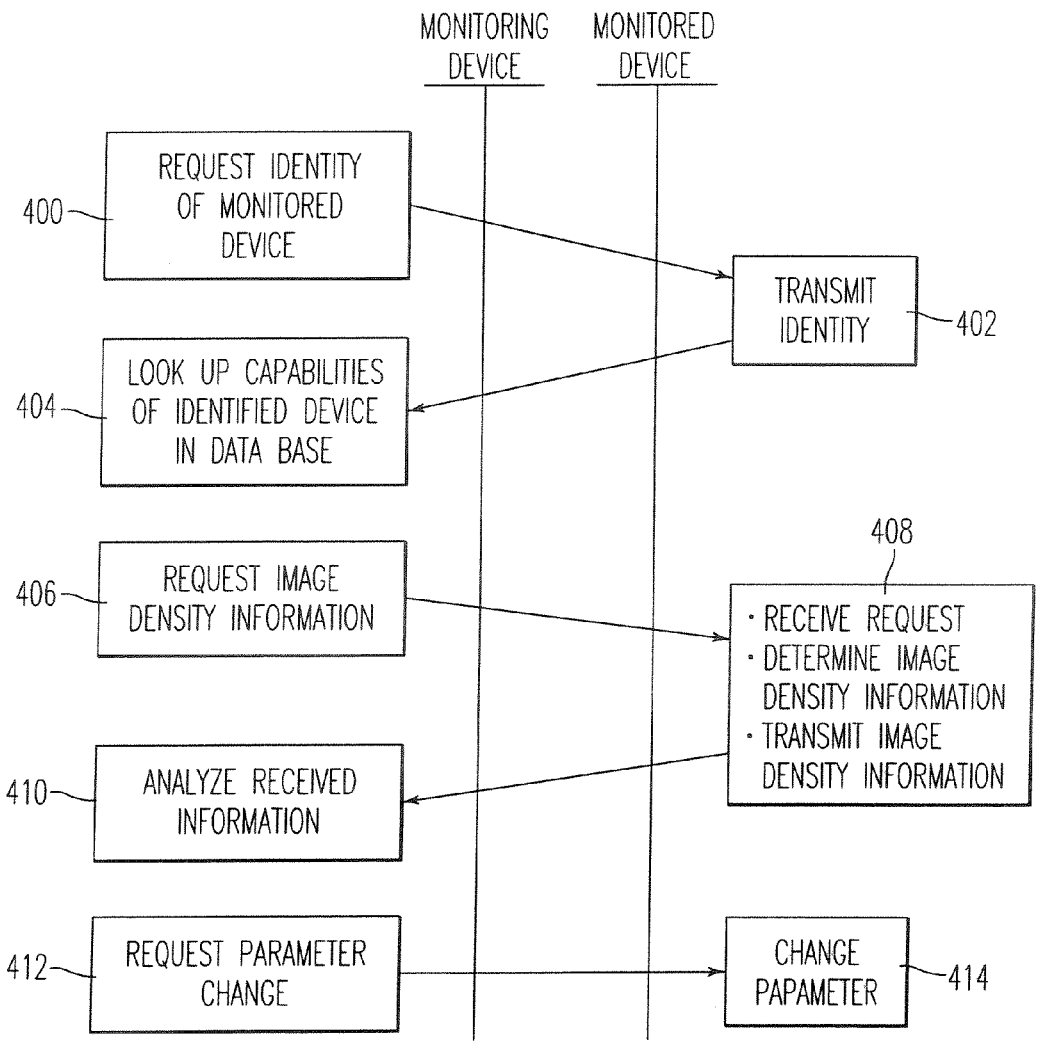
FIG. 11 illustrates a connection-mode of transmission between the monitoring device and the machine being monitored.

FIG. 11 illustrates a connection-mode of communication initiated by the monitoring device. Initially, step 400 requests the identity of the monitored device and the monitored device transmits its identity in step 402. In step 404, the monitoring device verifies the identity and looks up the capabilities of the identified device in a data base. The data base describes various information of the monitored device or machine such as service history, optional equipment, usage information, or other information. In step 406, the monitoring device requests image density information from the monitored device. In step 408, the monitored device receives the request for image density information, determines the image density information (or looks up previously stored image density information) and transmits the image density information back to the monitoring device in step 408. In step 410, the monitoring device analyzes the received information (i.e., compares the received information with information looked up in the data base) and determines that it is appropriate to change parameters of the monitored device. Step 412 requests parameters of the device to be changed and transmits an appropriate command. In step 414, the monitored device changes its operating parameters in accordance with the received command.

Figure 12A:
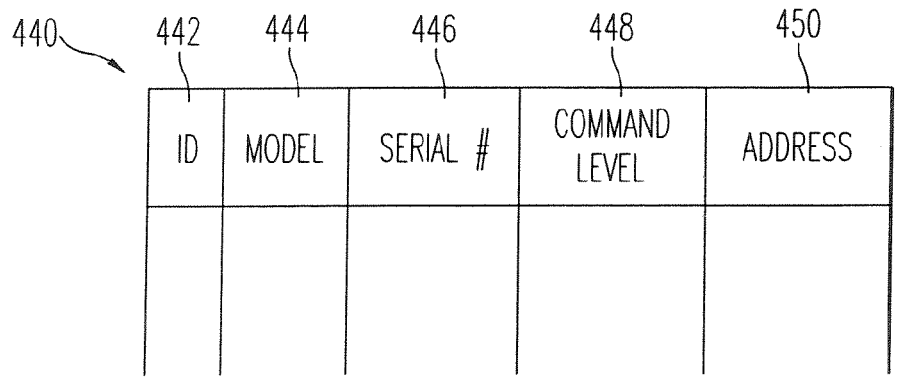
FIG. 12A illustrates the main components of the service data base.
Figure 12B:
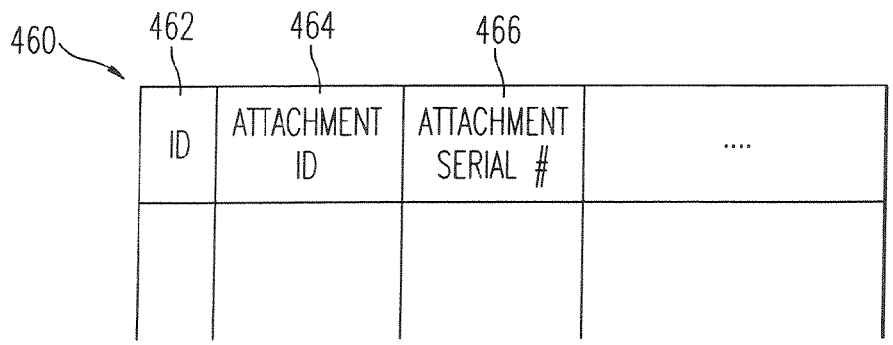
FIG. 12B illustrates information of an attachment and options data base.
Figure 12C:
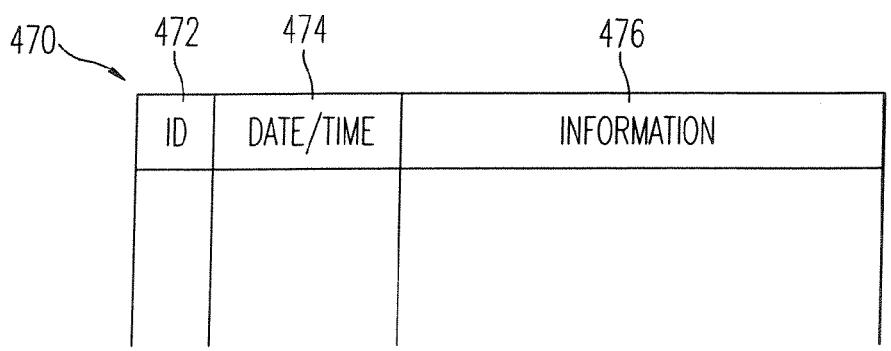
FIG. 12C illustrates a data base used for keeping track of the history of various machines.

FIGS. 12A through 12C illustrate various data base structures which may be used by the invention. FIG. 12A illustrates a simple data base 440 containing the machine ID 442, the model number 444, the serial number 446, a command level 448, and an address 450. The ID 442 is a unique describer of the device and used to link various data bases describing the device such as the data bases illustrated in FIGS. 12B and 12C. The command level 448 indicates whether the machine can process simple or complex instruction sets. The address 450 contains the connection and connectionless address information including the network address, phone number, name, and any other information necessary to identify the machine.

Linked to the data base in FIG. 12A are the data bases in FIGS. 12B and 12C which respectively describe attachment information and the history of the machine. The data base structure 460 illustrated in FIG. 12B is for attachments and options for machines contained in the data base of FIG. 12A and contains an ID field 462 which corresponds to the ID field 442 of FIG. 12A. The attachment ID field 464 indicates the type of optional attachments connected to the machine such as a sorter, automatic document feeder, or other attachment. The attachment serial number 446 is the serial number of the attachment connected to the machine. The attachment ID field may be linked to a data base describing various features of the attachment data base. Other fields may be contained in the attachment and option data base 460.

The history of the machine is stored in a separate data base illustrated in FIG. 12C. The data base structure 470 again contains an ID field 472 which is used to link the various data bases. A date and time field 474 and an information field 476 is used to describe malfunctions or other special conditions and events within the machine including the date and time at which an event occurred.

The data bases as illustrated in FIGS. 12A-12C are illustrative of the type of information which is stored regarding the machine. Even though illustrated as separated data bases, the implementation of the data bases may include more or less data bases. Different departments within a company may maintain different data bases describing information about the various machines. The service data base will be most complete about individual machines, contain a complete service history of each machine, and may be stored at a customer service division. Separate manufacturing, engineering and marketing department data bases may be maintained and use the information generated from the machine. The different data bases may be linked through different fields. For example, the service data base may be linked to the manufacturing data base through the serial and model numbers. The manufacturing data base and engineering data base may be linked through a version and model number, and the service data base and engineering data base may be linked through model numbers. Any type of known data base scheme may be used to maintain and share information, as needed.

Separate analysis and decision software may be created which allows a user to make a specific inquiry into any one or more of the data bases. The user may formulate any type of query and the data bases searched to produce the requested information. The analysis and decision software is also used to generate monthly or other regular reports describing information of the machines and may generate an alert or other type of warning when a malfunction occurs.

TABLE 1A

Monthly Report Message From Copiers

Copy count and job count
List of changed parts detected
List of parameters changed
Use of duplexing
Use of reduction
Use of enlargement
Copy counts for various paper sizes
Use of manual feed

TABLE 1B

Monthly Report Message From Printers

Copy count and job count
List of changed parts/supplies
List of set up changes
Use of duplexing if available
Copy counts for various paper sizes
Numbers of jobs for various printer
languages such as PCL5 and Postscript
Use of manual feed

TABLE 1C

Monthly Report Message From Facsimile Machines

Number of transmissions and receptions
Number of pages sent
Number of pages received
Counts for special features such as speed
dials Tables 1A-1C illustrate monthly report messages which may be generated for copiers, printers, and facsimile machines. These monthly reports simply show the parameters, usage, and other information of the machines and of course may be different and include more or less information, as desired.

TABLE 2

Communication Commands

| Operator | Operands |
| --- | --- |
| Set | T V |
| Get | T |
| Report | T V |
| Set_List | $T_1 V_1, T_2 V_2, \ldots, T_n V_n$ |
| Get_List | $T_1 T_2, \ldots, T_n$ |
| Report_List | $T_1 V_1, T_2 V_2, \ldots, T_n V_n$ |
| Copy_Memory_To_Memory | Source Destination Num_Byte |
| Copy_Memory_To_Disk | Source Name Num_Byte |
| Copy_Disk_To_Memory | Name Destination |
| Command_Not_Understood | Operator and Operands |

T: Target, V: Value

Table 2 illustrates various communication commands which may be used to implement the communication operations described herein. The left-side of the table contains the operators and the right-side of the table contains the operands. In the table, T indicates a target which is a specific address, parameter, sensor, or stored data, and V is a value. The commands illustrated in Table 2 are the set command which allows a specific address, parameter, or stored data to be set to the value contained in V. Similarly, the get command allows specific target information to be obtained. The report operator is included in a report from the monitored machine of information requested by the get operator. The set_list, get_list and report_list allow more than one target and value to be obtained, set or generated using a single operator. The illustrated copy commands allow information to be copied from one memory address to another memory address, from a memory address to a disk, and from a disk to a memory location. The command_not understood operator indicates that a specific operator and/or operand(s) was not understood.

TABLE 3A

Commands to Copier

| | |
| --- | --- |
| get | id; |
| get | sorter yes; |
| get | adf yes; |
| get | configuration; |
| get | A100; |
| get | A100 FFAA; |
| get | copy_count; |
| get | jam-count; |
| get | last_toner-change; |
| get | boot A100; |

TABLE 3B

Response from Copier

| | |
| --- | --- |
| report | id AX301B3330; |
| report | configuration LIST (sorter yes, adf yes, large_capacity_tray no, . . . . . ); |
| report | A100 AABB; |
| report | A100 FFAA; |
| report | copy-count 9895; |
| report | jam-count 0; |
| report | last toner change 12Apr95; |

Table 3A illustrates commands which may be sent to a copier from a remote monitoring and diagnostic device and Table 3B illustrates the response from the copier after receiving the commands of Table 3A. After the get id command in Table 3A, the response from the copier is a report of the id which is AX301B3330; . The second line of Table 3B illustrates the use of "LIST". In this case, the configuration includes more than one target parameter and therefore, the group of target parameters and their value are preceded by the "LIST" operator. The information in Tables 3A and 3B has been created for illustrative purposes. By setting the sorter and automatic document feeder (adf) in the second and third commands to the copier to be activated, no response from the copier is generated. In response to the get configuration command, there is a report generated from the copier in the second response from the copier. Also illustrated in Tables 3A and 3B are the getting and setting of a specific memory location A100. The last command in Table 3A is the setting of boot to A100. This means that upon rebooting or reinitialization of the copier, the memory location A100 is to be read.

In addition to the machines accessing the Internet through a LAN, the machine can alternatively access the Internet through a telephone line, ISDN, or cable via an Internet access provider or a dial-up service such as America On Line. In this manner, a machine that is not connected to a network can still use a connectionless mode of connection. In this case, the machine will have to periodically dial the Internet provider in order to receive incoming Internet e-mail messages.

Diagnostic and statistical information regarding the operation of a business office device or other machine might be considered confidential or proprietary information and therefore, people may not wish to have this information viewed by unauthorized people. The unauthorized viewing of transmitted data is a particular concern when information is transmitted over the Internet. Further, it is desirable to prevent the transmission of confidential information such as information from a machine or business office device which should not be remotely monitored, or information which is unrelated to the business office device over the Internet, with this information being disguised as diagnostic and status information of a business office device. The flowcharts of FIGS. 13A, 13B, and 14 illustrate processes for monitoring information transmitted from a company to a remote data center over the Internet, for example.

The information which is to be transmitted over the network originates from any one of the devices connected to the network 16 in FIG. 1 such as the printer 32, the facsimile machine 28, the digital copier/printer 24, any other type of machine or any of the workstations connected to the network 16. The information to be transmitted preferably originates from electromechanical sensors which are sensors which detect the state such as the mechanical state of the device or machine and output the sensed state electrically. The electromechanical sensors may be constructed not to have any moving parts and may be implemented, for example, as an optical sensor which detects the presence of paper, although the electromechanical sensor may detect any other feature of the business office device or machine and be implemented in any desired manner. The information is transmitted, for example as an e-mail message, through the firewall 14, over the Internet 10, and to a data center which processes and monitors the data of the business office device such as the workstation 42 through the firewall 40, or to any of the workstations connected to the network 52 through the firewall 50. The security center which monitors outgoing messages from the network 16 is implemented in any of the workstations connected to the network 16, or alternatively is implemented within the firewall mechanism 14.

Figure 13A:
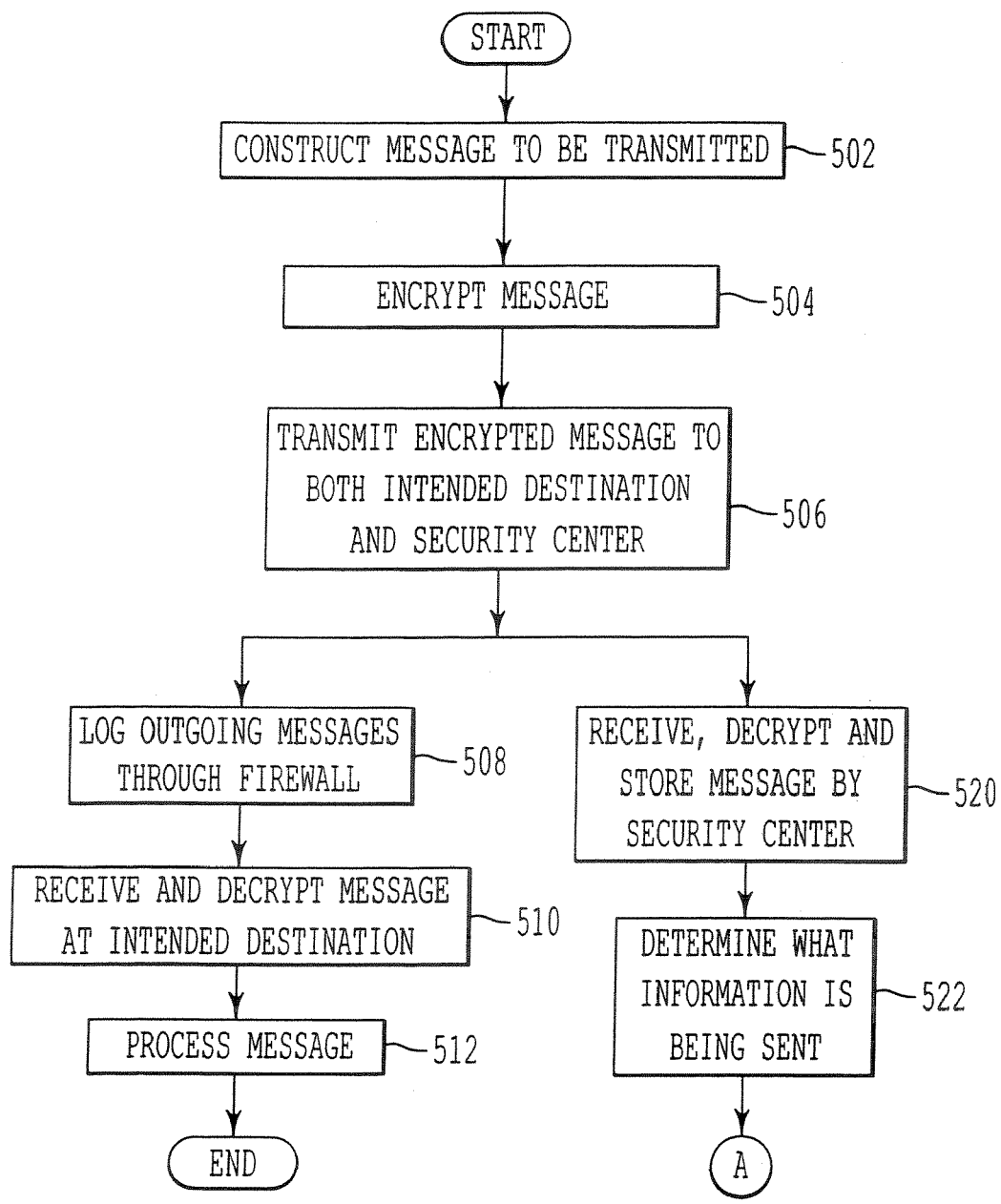
FIGS. 13A and 13B are a flowchart illustrating a first embodiment of monitoring outgoing messages from a business office device to a data center by a security center.
Figure 13B:
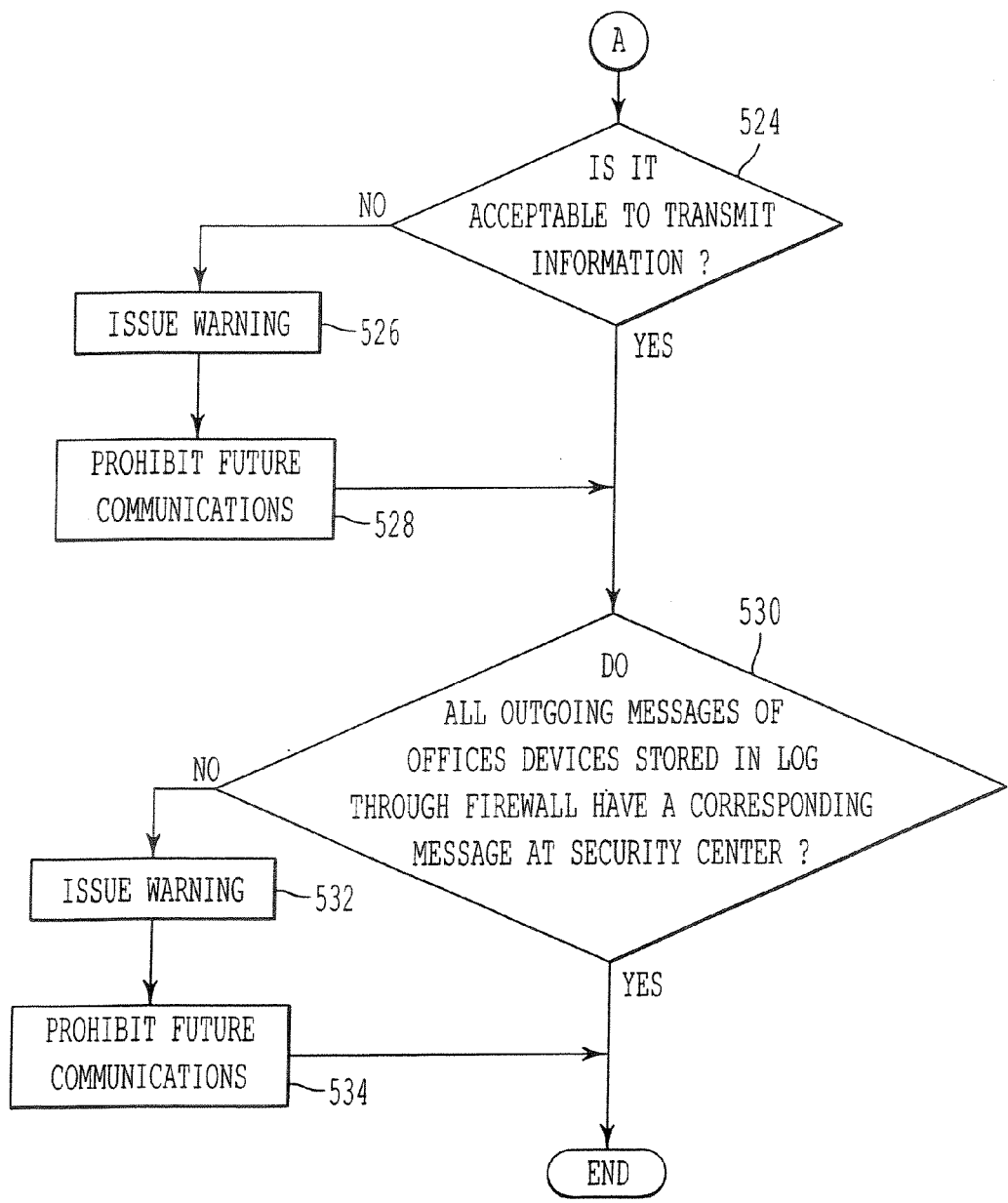
Figure 14:
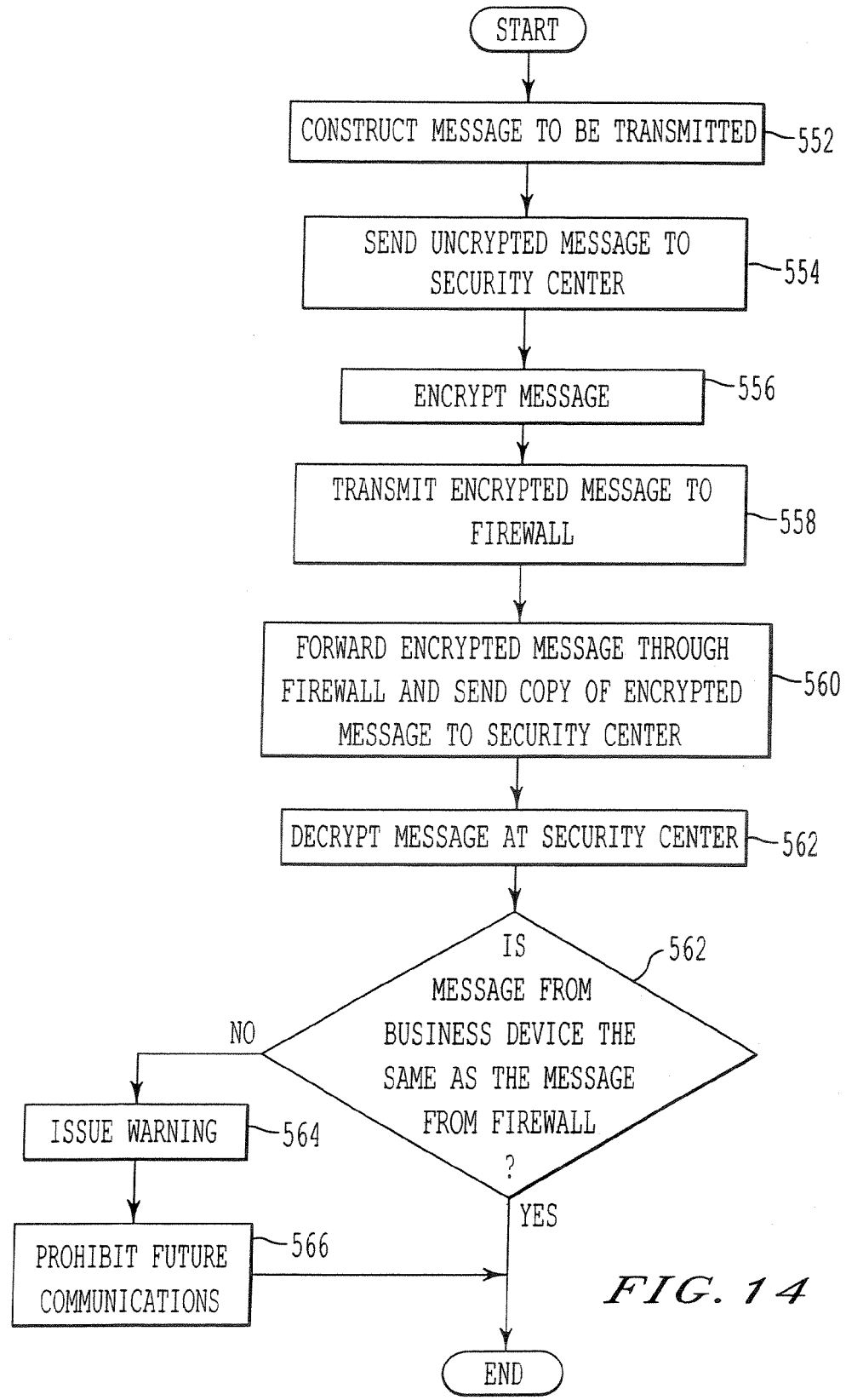
FIG. 14 is a flowchart illustrating a second embodiment of monitoring outgoing messages from a business office device to a data center by a security center.

In the process of FIGS. 13A and 13B, after starting, step 502 constructs a message to be transmitted in step 502 by a machine such as one of the business office devices 32, 28, or 24. This message is then encrypted in step 504 by one of the business office devices or by an alternative mechanism connected to the business office device. The encrypted message is then transmitted in step 506 to the intended destination such as a data center which monitors and processes received messages such as the workstation 42 or one of the workstations connected to the network 52, and is also transmitted to a security center, also referred to as a security device, which may be implemented using one of the workstations connected to the network 16, or within the firewall 14. The transmission of the message to both the security center and the data center ensures that the security center or security group receives the same message as was transmitted through the firewall 14 over the Internet. As an alternative, instead of the business office device sending the message to the security center, the firewall 14 sends a copy of the message passing therethrough to the security center to assure that the security center receives a true copy of the message sent over the Internet.

The outgoing message is stored in a log or database, preferably contained at the firewall 14 in step 508. This logging is performed so that the security center which also receives a copy of the message can check (in step 530 described below) that a copy of all outgoing messages are received. Within the intended destination such as the data center which processes the message to monitor, diagnose, and/or correct a machine from which the message originates, the encrypted information is received and decrypted in step 510, and processed in step 512 in order to monitor, diagnose and/or control the machine. At the same time, the encrypted message such as the e-mail message is received, decrypted, and stored in step 520 by the security center such as one of the workstations connected to the network 16, or alternatively the firewall 14. In step 522, the security center determines what information is being sent. In order to perform step 522, it is necessary to be able to decode the decrypted message, for example using a computer program executing on a general purpose computer. For example, the data transmitted from one of the business office devices may be in a binary form or other format which cannot be easily processed or understood by a human or machine. Therefore, it is necessary to determine, using the computer program, the real meaning of the data which is being sent.

Step 524 then determines if it is acceptable or permissible to transmit the information contained within the message which was encrypted in step 504. If this message is standard data describing the state of a business office device which does not have a high security concern and therefore can be remotely monitored, the data can be transmitted. Alternatively, if step 524 determines that it is not permissible to transmit the data, a warning is issued in step 526 such as a warning to a human monitor of a security device. Step 528 then prohibits future communications, if desired, from the machine which is transmitting the data. It is not permissible to transmit the data when the data is from a machine which should not be remotely monitored and/or controlled or the data contains confidential information which should not be transmitted. After an initial time period such as several days, a week, or a month, the checking of step 524 does not have to be performed for every transmitted message but outgoing messages may be checked randomly. This random checking will reduce the burden on a person checking the messages. However, if the outgoing messages are checked by a machine, it is preferable to monitor every outgoing message.

Step 530 then determines if the outgoing messages of the machines or office devices which are stored in the log at the firewall 14 have a corresponding message at the security center. When the security center is implemented as a device which is different from the firewall 14, if step 506 is properly performed each time such that the encrypted messages transmitted to both the intended destination such as the data center and the security center, the security center will have received a message corresponding to each message stored in the log at the firewall. However, if someone or a machine attempts to transmit an unauthorized message through the firewall 14, a log of this message will be kept whereas the security center will not receive a corresponding message. If step 530 determines that there is not a correspondence between the outgoing messages through the firewall 14 and the messages which have been received by the security center, flow proceeds to step 532 which issues a warning such as a warning to a human monitor of a security device by illuminating a warning lamp, generating an audible warning, or generating a computer message. Step 534 then prohibits future communications, if desired, from the machine which is transmitting data, prohibits all communications through the firewall, or performs a different type of security action. The process of FIGS. 13A and 13B then ends. Also, if step 530 determines that all logged messages passing through the firewall 14 have a corresponding entry at the security center, the process ends.

As an alternative to the steps illustrated in FIGS. 13A and 13B, instead of transmitting the encrypted message to both the intended destination and the security center at the same time in step 506, the message is first transmitted to the security center and transmission to the intended destination is delayed until it is determined that it is acceptable to transmit the information in steps 524 and 530.

As yet another alternative, step 524 monitors the e-mail addresses of the originating device and/or the destination device. If one or both of these addresses does not match a list of permissible addresses stored in a database, a warning is issued, future communications prohibited, and/or other actions taken to signal the occurrence of the attempted improper transmission.

FIG. 14 illustrates a second embodiment of monitoring outgoing transmissions. After starting, step 552 constructs the message to be transmitted by the printer 32, facsimile 28, digital copier/printer 24, or a device connected thereto. This message is transmitted in an unencrypted form to a security center in step 554 which is implemented in any of the workstations connected to the network 16 or within the firewall device 14. By sending the unencrypted message to the security center in step 554, the security center will have a reference which is subsequently compared, as described below, with the message passing through the firewall over the Internet to the data monitoring center.

Step 556 then encrypts the message to be transmitted, either at the machine such as the business office device or by another device connected to the business office device. The encrypted message is then transmitted to the firewall 14 in step 558. The firewall 14 forwards the encrypted message through the firewall over the Internet to the intended destination and also sends a copy of the encrypted message back to the security center, Step 562 then decrypts the message at the security center which was forwarded by the firewall 14. Step 562 then compares the message received from the business device which was transmitted in step 554 with the message received from the firewall 14. If it is determined that the messages are not the same, a warning such as a warning to a human operator is issued in step 564 and future communications are prohibited, if desired, or other security actions and preventive measures are taken in step 566. The process of FIG. 14 then ends. If step 562 determines that the message from the business device is the same as the message received at the firewall, the process of FIG. 14 ends. Alternatively, before the process of FIG. 14 ends, e.g., after step 562 results in an affirmative response or after step 566, a step of checking the contents of the outgoing message can be performed in a similar manner as steps 524, 526, and 528 of FIG. 13B are performed.

As an alternative to forwarding the encrypted message through the firewall over the Internet and at the same time sending a copy of the encrypted message to the security center, the encrypted message can be held at the firewall until the security center determines in step 562 that the message from the business office device is the same as the message copied from the firewall. This prevents an unauthorized communication from being transmitted through the firewall before it can be checked.

Different features of the security aspect of this invention are shown in the flowcharts of FIGS. 13A and 13B, and FIG. 14. The present invention includes embodiments having various combinations of features from each of the FIGS. 13A and 13B, and 14.

The security center which is described in the flowcharts of FIGS. 13 and 14 should be restricted to authorized personnel so that the security measures are not bypassed and properly implemented and that confidential data is not viewed by people who are not authorized, In the embodiments disclosed above, the message which is ultimately transmitted is either relayed by the security center, or alternatively, the security center receives a copy of the data and the data within the message is transmitted by the business office device. The invention also allows the security group to store and archive the outgoing messages in case the messages are ever needed, for example, to see if passed security breaches have occurred, or to monitor the history of the operation of the business office device.

An aspect of this invention is the use of both connection-mode and connectionless-modes of communication. While connectionless-mode communications may be less expensive than connection-mode communications over long distances, connectionless-modes of communication such as Internet electronic mail messages may not be as reliable as connection-mode messages, for example such as direct telephone connections using modems. An aspect of this invention is therefore to make an initial attempt in communicating using a connectionless-mode message and if an acknowledgment is not received indicating receipt of the connectionless-mode message, an alternate mode of communication such as a connection-mode communication is utilized or a message indicating an error and requesting a user to call a service center may be displayed.

Figure 15:
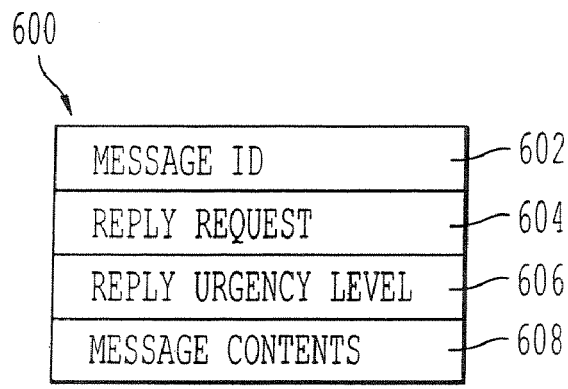
FIG. 15 illustrates a data structure containing the fields utilized in a transmitted message.

FIG. 15 illustrates a data structure 600 which is stored in a memory and transmitted in order to receive a reply or acknowledgment of receipt of the message. The data structure 600 begins with a message ID field 602 which is a unique reference used to identify the message. An aspect of this invention is to determine or monitor the time which has passed after a message is sent in order to determine if an alternate mode of communication is to be used. One manner of storing the time the message was sent is to include in the message ID field an indication of the time and date the message was sent. As an example of how to generate the message ID field 602, the computer programming language C includes time and date functions. For example, the function "time" returns the current calendar time encoded in an integer type of long. Further, the C functions gmtime and localtime convert an arithmetic calendar time returned by the "time" function to a broken-down form of type "struct tm" The gmtime function converts to Greenwich Mean Time (GMT) while localtime converts to a local time, taking into account the time zone and possible daylight saving time. The structure "struct tm" includes the fields which provide in integer format seconds after the minute, minutes after the hour, hours since midnight, day of month, month since January, years since 1900, day since Sunday, day since Jan. 1, daylight saving time flag. While this is one example which the C programming language provides for specifying the time and date, any other desired function can be utilized to use the time and date within or associated with the message. For example, it is possible to use the output from the function time(time_t*tp) and convert this value to a hexadecimal number for the message ID. If desired, there is no need to use the local time. While the message ID has been described using time and date information, it is also possible to assign any other numeric, alphanumeric, alphabetic code, or any desired characters to the message ID and to store the time and date in a separate field, if desired.

A second field of the data structure 600 is the reply request field 604. The reply request field indicates whether or not the sender of the message requests a reply or acknowledgment that the message has been received. One manner of implementing this aspect of the invention is to set the reply request field to "0" when a reply is not needed and to set the reply request field to "1" when a reply is needed. However, any type of flag or other indicator may be used to indicate whether a reply request is desired.

Field 606 of the data structure 600 illustrated in FIG. 15 contains the reply urgency level. This field is utilized to indicate how urgent it is to receive a reply. This field may be implemented by assigning the number 9 to the highest urgency level, 5 to a medium urgency level, and 1 to a low urgency level. If the reply urgency level is set too high, an acknowledgment or reply should be received within a short period of time and if it is not received within a short period of time, an alternate manner of communication may be utilized. Alternatively, if the reply urgency level is set to a low value, a longer period of time may be utilized before an alternative manner of communication is attempted. While the reply request and reply urgency level are illustrated as being separate fields 604 and 606 in FIG. 15, if desired, a single field may be utilized for storing and transmitting both types of information. This may be accomplished by having a reply urgency level of 0 indicate that no reply or acknowledgment is requested and having a value greater than 0 indicating that a reply is requested, for example.

The last field illustrated in the data structure 600 is a message contents field 608. Field 608 stores the contents of the message which are being transmitted and may include any desired operator or command which requests that an operation be executed. These commands are typically the commands utilized to diagnose and/or control a device having sensors such as a business office device but may contain any desired message contents including the message contents passed between general purpose computers.

Figure 16:
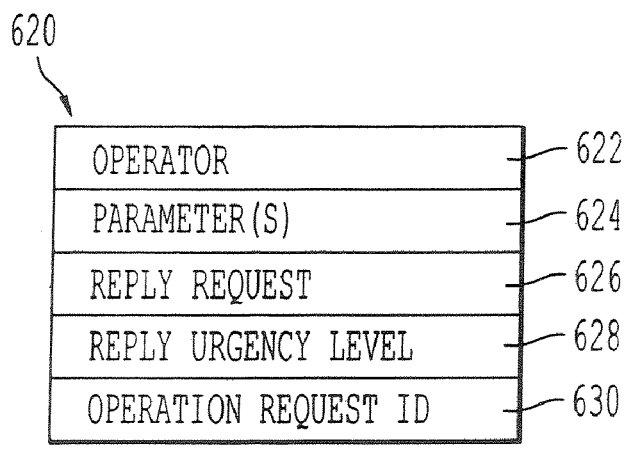
FIG. 16 illustrates a data structure utilized to transmit the information of an operator contained within the message contents of a transmitted message.

FIG. 16 illustrates a data structure 620 which is utilized to transmit information of individual operators or operation commands which execute functions or request information. A field 624 is utilized to store one or more parameters associated with the operator or command. The operators which are utilized by the present invention may include any of the operators described herein or in any of the applications or patents which are related to this application. A non-limiting list of various operators which can be utilized with this invention include, for example, the commands illustrated in Table 2 such as Get, Get_List, Set, Set_List, Copy_Memory_To_Memory, Copy_Memory_To_Disk, and Copy_Disk_To_Memory.

Field 626, 628, and 630 of FIG. 16 are utilized to request a reply or acknowledgment relating to the status of a specific operator. Just as the present invention provides for a reply or acknowledgment of receipt or processing of a message, individual replies may be provided for each, individual operator within a message, although it is not required to implement this feature. The reply request field 626 indicates whether a reply is desired for the operator named in field 622. Field 628 indicates the urgency level of the reply and may be implemented using a numerical scale of 1 to 9 or 0 to 10, for example. The operation request ID field 630 is utilized to identify the specific operator named in field 622 when there are a plurality of operators having the same name within a message. For example, the first time an operator occurs within a message the operation request ID field would be the operator name with a suffix of 1. The second time the same operator appeared within a message, the operation request ID field 630 would be the operator name with a suffix of 2, etc. Therefore, a specific operator can be identified by providing the message ID and the operation request ID. Alternatively, the operation request ID field may contain a unique number similar to the message ID field and therefore, the operation request ID field alone would be sufficient to identify both the message ID and the particular operator.

Figure 17:
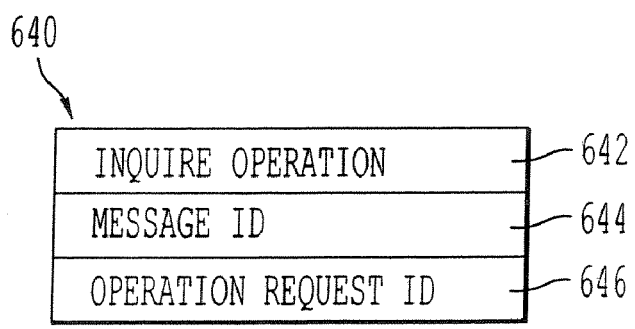
FIG. 17 illustrates a data structure which is utilized to inquire into the status of an operation which was earlier transmitted.

FIG. 17 illustrates a data structure 640 which is transmitted in order to inquire into the status of the operation associated with the operation request ID field 646. The data structure 640 includes an inquire operation field 642 which is utilized to indicate that the status of a particular operation or operator is being requested. Field 644 indicates the message ID associated with the message which contains the operator, and the operation request ID 646 is utilized to identify the particular operator contained within the message associated with the message ID.

Figure 18:
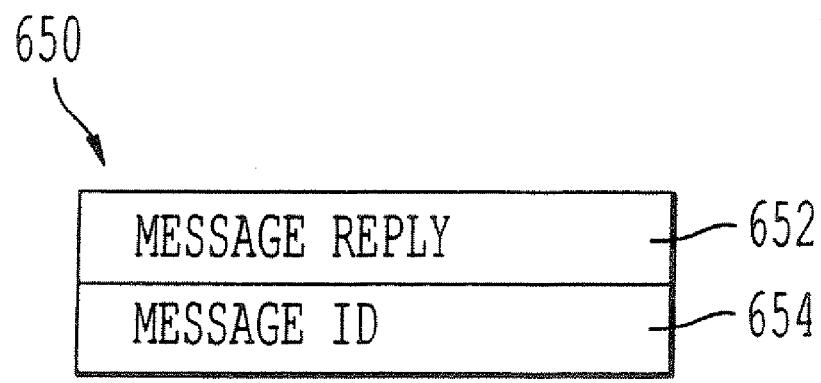
FIG. 18 illustrates a data structure containing fields utilized in a message reply acknowledging the receipt of a message.

When a message reply is received, the contents of the message reply may be as illustrated in the data structure 650 illustrated in FIG. 18. The data structure 650 contains a message reply field 652 which indicates that the received message is a reply to or acknowledgment of a message for which a reply was requested. A message ID field 654 returns the message ID of the message being acknowledged. In addition to the field illustrated in FIG. 18, the data structure 650 may also include, if desired, a field indicating the date and time the original message was received by the receiving device and/or the date and time the message reply was transmitted from the receiving device. The present invention may be constructed such that if a message which is very old is received, a message reply is not sent. For example, if a message is received by the receiving device with a high urgency level more than two days after the time and date contained within the message ID, it may not be appropriate to send a reply or acknowledgment of receipt as an alternate manner of communication would have already been used.

Figure 19:
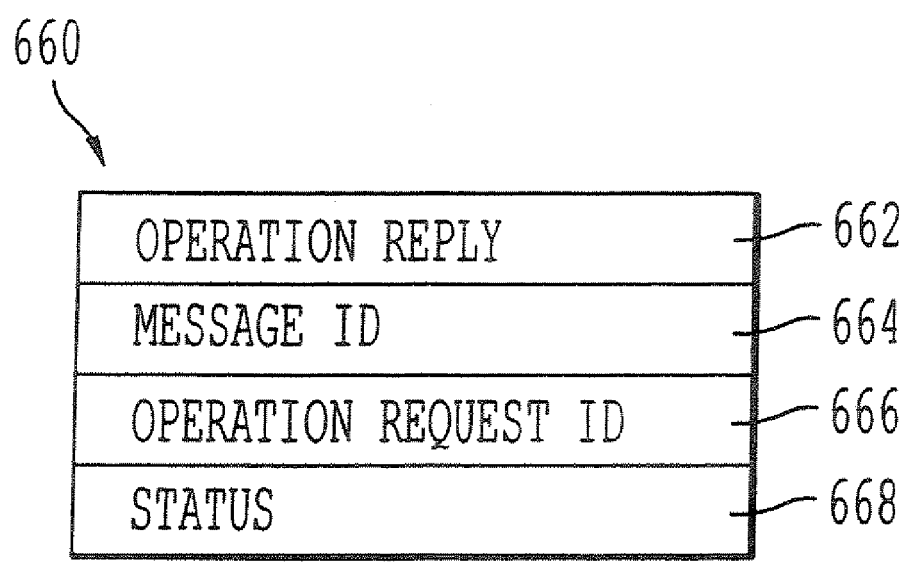
FIG. 19 illustrates a data structure containing fields utilized to indicate the status of an operation which has been requested to be performed.

FIG. 19 illustrates a data structure 660 which is utilized to provide the reply for a specific operation. Field 662 is utilized to indicate that a reply for a specific operation is being sent. A message ID field 664 and an operation request ID field 666 are utilized to indicate the particular message and operation or operator within the message. A field 668 is utilized to indicate the status of the operator. Exemplary statuses which may be used with this invention include an indication that the execution of the particular operator has not started, is in progress, is done or has been completed, or has had an abnormal termination. Any other status which is appropriate to the operator can also be transmitted.

The connectionless-mode messages utilized with the present invention are preferably Internet electronic mail messages, although any other type of connectionless messages may be utilized. A current accepted standard in Internet electronic mail communications is the Simple Mail Transport Protocol, referred to as SMTP. The Simple Mail Transport Protocol is defined in the Request for Comments (RFC) 821. The Request for Comments 822 specifies further information of the format of Internet electronic mail messages and has been updated by RFC 1327. Each of the above Request for Comments is available on the Internet and is incorporated herein by reference. SMTP uses TCP (Transmission Control Protocol) packets to transport data from the sending machine to the receiving machine. An SMTP conversation is carried on by two pieces of software running on machines connected to the Internet, called Mail Transport Agents (MTAs). The details of implementing Internet electronic mail communication are well known.

The present invention utilizes electronic mail messages in a unique manner. An exemplary Internet electronic mail message which may be used as a connectionless-mode message in the present invention is illustrated as message 680 in FIG. 20. The beginning of this message through the line beginning with "Status:" is the message header. The message header contains predefined fields and may be utilized to route the message and/or determine basic information about the message. In the example of FIG. 20, the message is to the monitoring device and from the monitored device. However, the information in these fields may be reversed as connectionless modes of communication may originate from either a monitoring device or a monitored device. The subject of this message is "Request" indicating a reply is requested. A conventional and standard way of generating the message body is to use ordinary text, sometimes referred to as plain text, which uses the character set defined as "US-ASCII". However, the present inventor has determined that it may be preferable to transmit messages which are encoded in binary. The format of the binary coding may be made using binary encoding as defined in ISO/IEC 8825, second edition, which is dated 1990-12-15. In order to convert the binary messages into the plain text format which uses the ASCII character set, a known process such as the UUENCODE process may be utilized to convert the binary message to a plain text message. As an alternative to using uuencoded messages, base-64 encoding as described at page 455 of the book "TCP/IP Illustrated, Vol. 1", by Stevens, and published by Addison-Wesley, 1994, may be utilized. The last six lines illustrated in FIG. 20 are the message content and may be impossible or extremely difficult for a human to ascertain as they are intended to represent a binary message encoded in a textual format. However, any format may be utilized to represent the message and message body.

In the present invention, the message content is preferably contained within the message body which is the body of the electronic mail message. Thus, there is no need to modify the standard fields utilized with Internet electronic mail messages. Therefore, the entire message including data structure 600 illustrated in FIG. 15 and each of the operators which utilize the data structure 620 are contained within the message body. However, as an alternative, one or more of these fields may be contained within the header of the electronic mail message. Further, the electronic mail message or any other communication utilized by the present invention may be encrypted, if desired, in order to provide a security measure and to prevent unauthorized people from reading the message contents. Any type of encryption process may be utilized by the present invention including known and conventional encryption processes.

As the entire message is included in the body section of the electronic mail message in the preferred embodiment of the invention, an appropriate reply or acknowledgment cannot be provided until the content of the message is processed and decoded. Therefore, by not using the arrival of the message to trigger an acknowledgment, the acknowledgment is not sent until the content is properly decoded. However, according to an alternative embodiment, it is possible to send an acknowledgment as soon as the message is received without processing the contents of the message or message body.

Figure 21A:
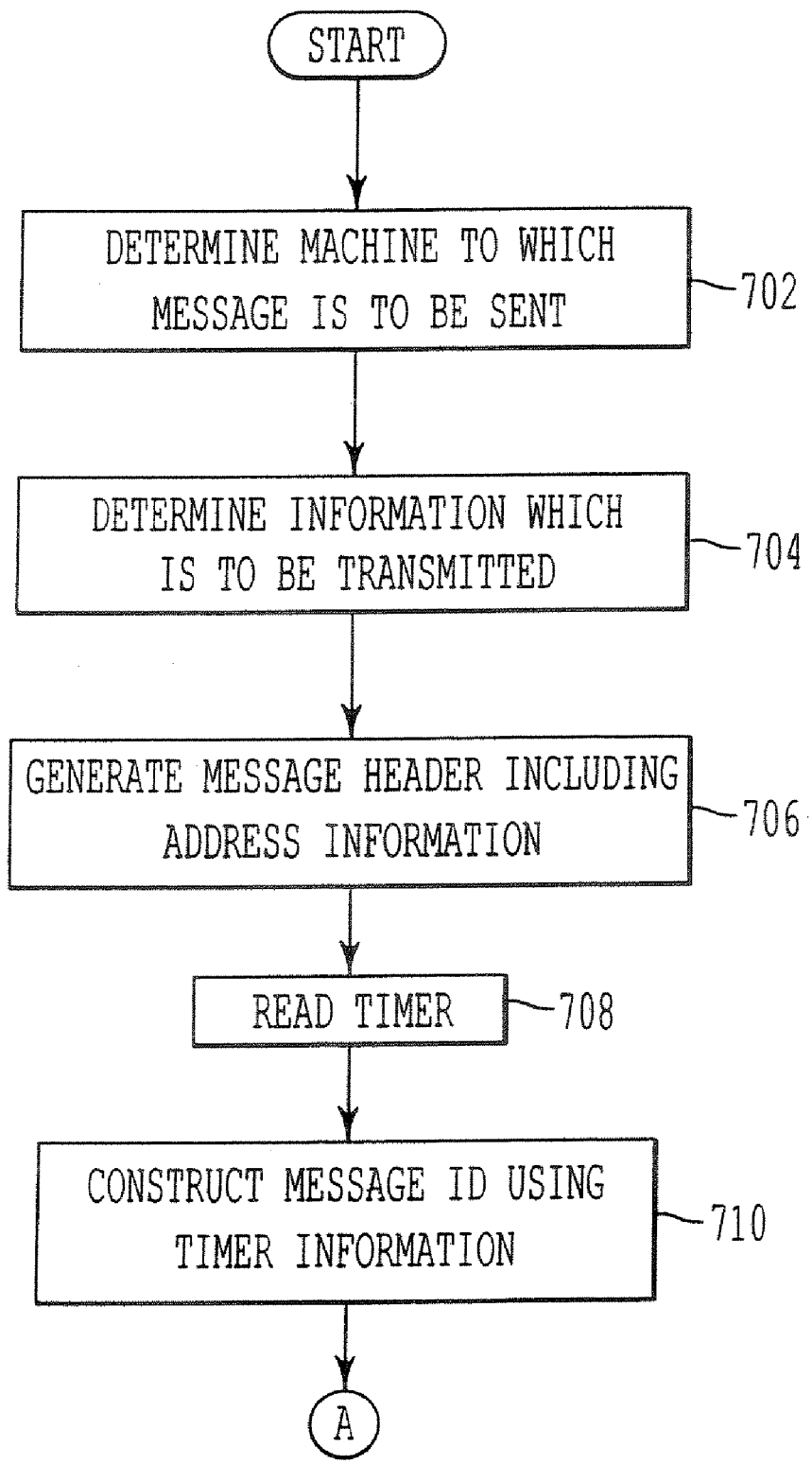
Figure 21B:
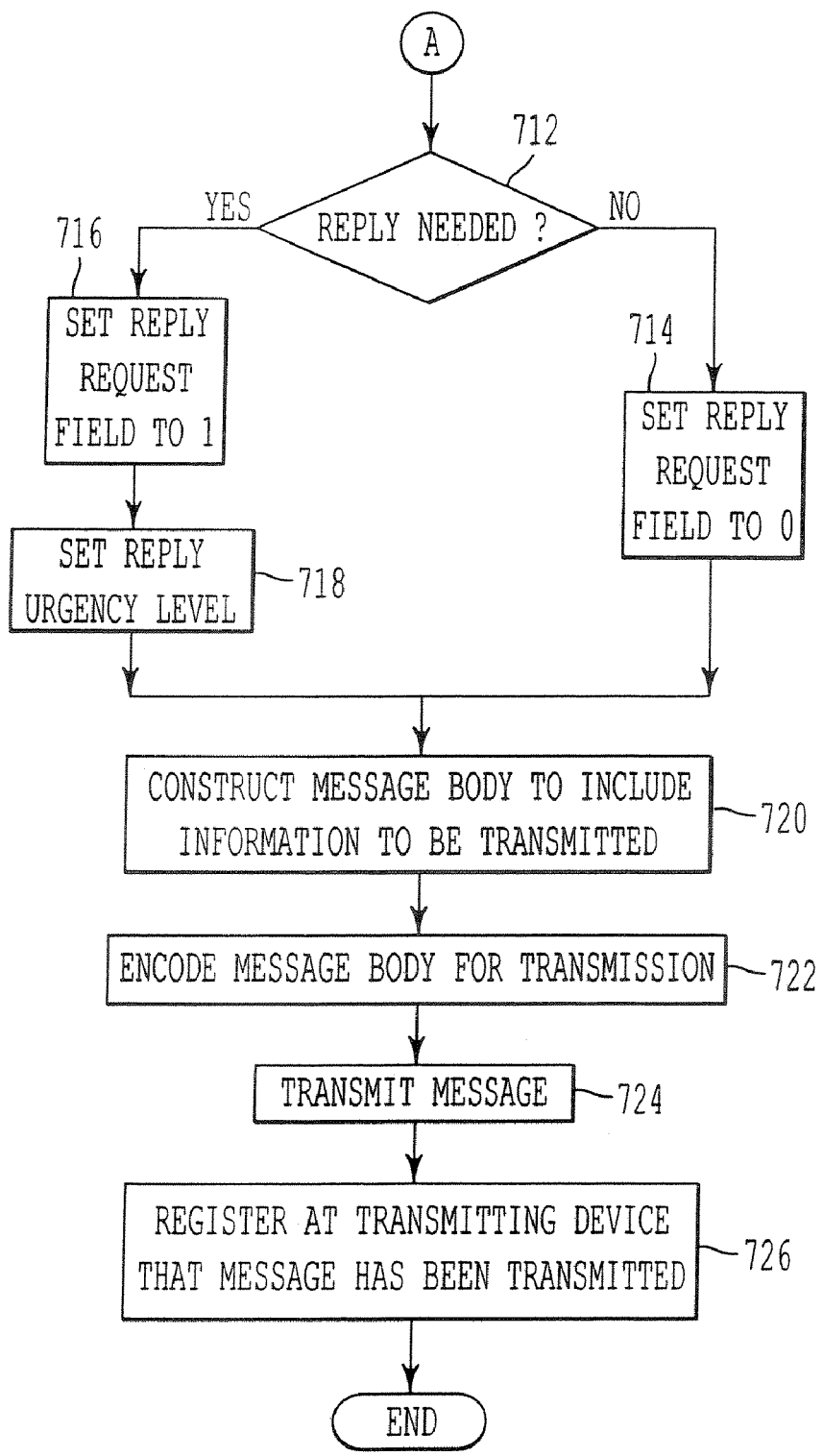

FIGS. 21A and 21B illustrate the process of creating a message to be transmitted and more preferably, a process for creating a connectionless-mode message which is to be transmitted. After starting, step 702 determines the machine to which the message is to be sent. The message may be sent to a monitored device such as a copier, printer, facsimile machine, scanner, multi-purpose machine, or any other desired machine such as a general purpose computer, for example, or may be sent to a remote diagnostic or control center, a monitoring device, or any other machine. Step 704 then determines the information which is to be transmitted in the message. For example the operators and associate parameters which are to be transmitted are determined in any desired manner. Next, step 706 generates the message header including the address information of the message. Such a message header is illustrated, for example, in FIG. 20 as the first ten lines of the electronic mail message 680. Step 708 then reads a timer within a computing device transmitting the message in order to determine the time at which a message is sent. Step 710 then constructs the message ID field, illustrated as field 602 in data structure 600 of FIG. 15, using the timer information as explained above. The message ID is preferably a unique identifier indicating the date and time the message was sent. From FIG. 21A, control proceeds to process A illustrated in FIG. 21B.

In FIG. 21B, step 712 determines if a reply or acknowledgment is needed which indicates that the transmitted message was received. If no reply is needed, control proceeds to step 714 which sets the reply request field 604 to indicate that no reply is required. If 0 is used to indicate that there is not to be any reply and 1 is used to indicate that there is a reply requested, step 714 will set the reply request field to 0. If step 712 determines that a reply is needed, step 716 sets the reply request field 604 to indicate that a reply is requested. For example, 1 in the reply request field 604 may be utilized to indicate that a reply is requested. Next, step 718 sets the reply urgency level which is stored in field 606 of data structure 600. A reply urgency field of 9 may be utilized to indicate that an urgent reply is required, 5 may be utilized to indicate a medium level urgency, and 1 may be utilized to indicate a low level urgency.

From steps 718 and 714, step 720 constructs the message body to include the information to be transmitted. This information to be transmitted includes the operators which may be transmitted in the message body using the data structure 620 illustrated in FIG. 16, and any other desired information. Details of how the individual operators and their associated data structures 620 are constructed are illustrated and explained with respect to FIG. 22. After the message body has been constructed, the message body is encoded for transmission in step 722. This may be performed by converting the message body to binary in step 722 to conform with, for example, ISO/IEC 8825. Also in step 722, the binary message is converted to a textual representation using either the UUENCODING process or a process which converts the message to base-64, for example. The entire message including the header and message body such as is illustrated in FIG. 20 is transmitted in step 724. Step 726 then registers at the transmitting device that the message has been transmitted and the process ends. The registration performed in step 726 is performed in order to properly monitor the receipt of acknowledgment or replies. If a message which is registered does not receive a reply within an appropriate amount of time, an alternate mode of communication may be utilized such as a public telephone line, an ISDN (Integrated Services Digital Network) line, a cable, or alternatively a message may be displayed to a user, for example, such as a message on an operation panel of a business office device indicating that it is necessary to call a service center or other diagnostic location.

Figure 22:
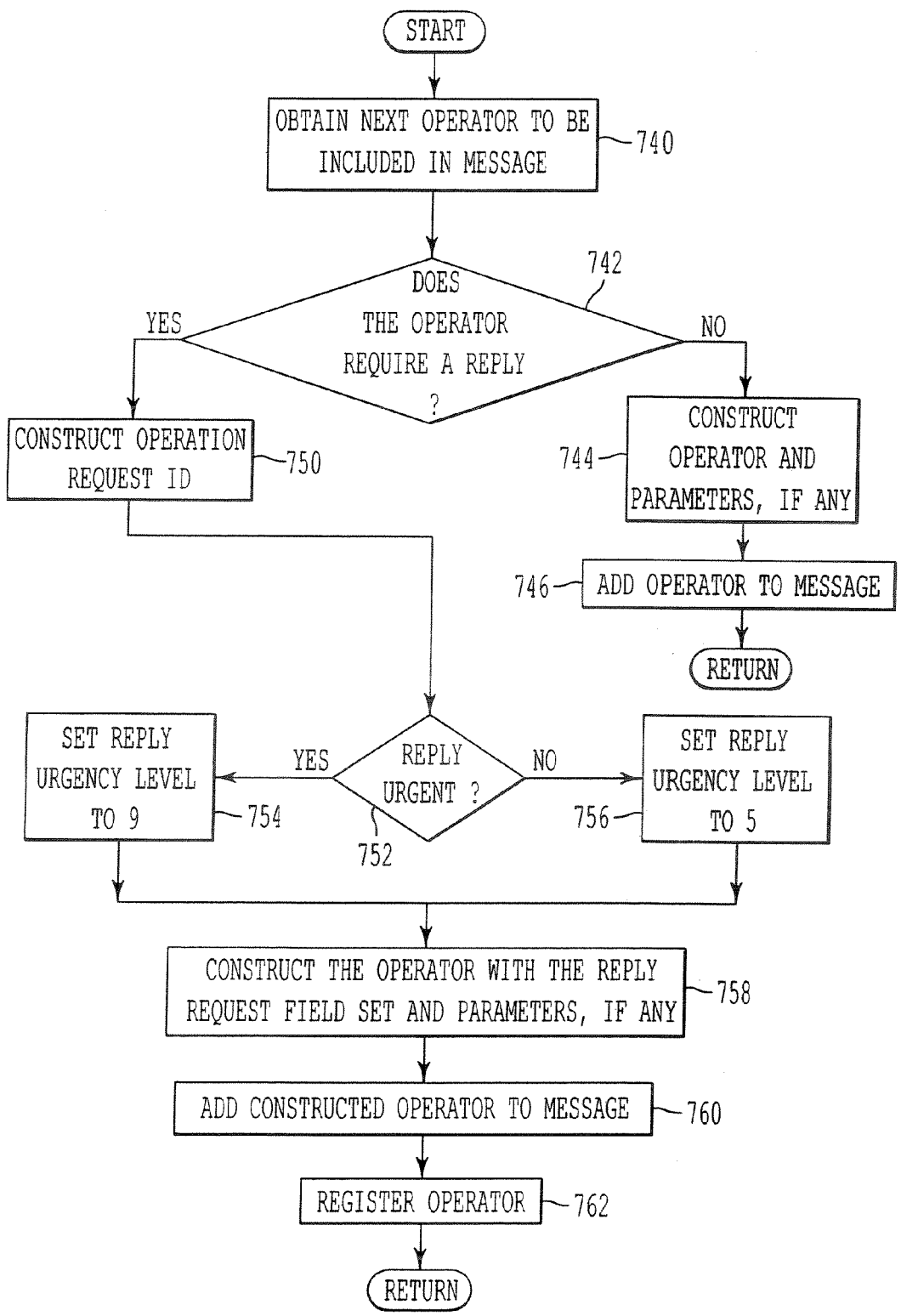
FIG. 22 illustrates a process of constructing the information of an operator which is contained in a transmitted message.

FIG. 22 illustrates a process of generating the data structure 620 illustrated in FIG. 16 which is utilized to store the information of individual operators or commands within the message body. After starting, step 470 obtains the next (or first) operator to be included in the message which is to be transmitted. Step 742 determines if the operator requires a reply or acknowledgment from the receiving device. If it does not, control proceeds to step 744 which constructs the operator and associated parameters, if any. For example, step 744 provides the information illustrated in fields 622 and 624 of FIG. 16. Step 746 then adds the operator and the associated parameters, if any, to the message body and control returns to the calling process. The process of FIG. 22 then can be executed for subsequent operators which are to be included in the message.

If step 742 determines that the operator does require a reply, control flows to step 750 which constructs the operation request ID. When the operation request ID is utilized to distinguish the same operator appearing within a message a plurality of times, the first time an operator appears within a message, its operation request ID is set to one. Subsequent occurrences of the same operator in the message are sequentially numbered and assigned an integer value. Step 752 then determines whether the reply for the operator is urgent. If the reply is urgent, step 754 sets the reply urgency field 628 illustrated in FIG. 16 to 9, for example. If the reply is not urgent, step 756 sets the reply urgency level 628 to 5, for example. It may be also possible to set the reply urgency level to 1, for example, indicating a low reply urgency.

Step 758 then constructs the operator with the reply request field 626 set, and any parameters which may be used. Step 760 adds the constructed operator and associated information contained within the data structure 620 to the message. Step 762 then registers that the operator is being transmitted. This registration process is performed in order to assure that appropriate action is taken when a required reply for the operator is not received. Control then returns to the calling process so that the next operator may be processed.

Figure 23A:
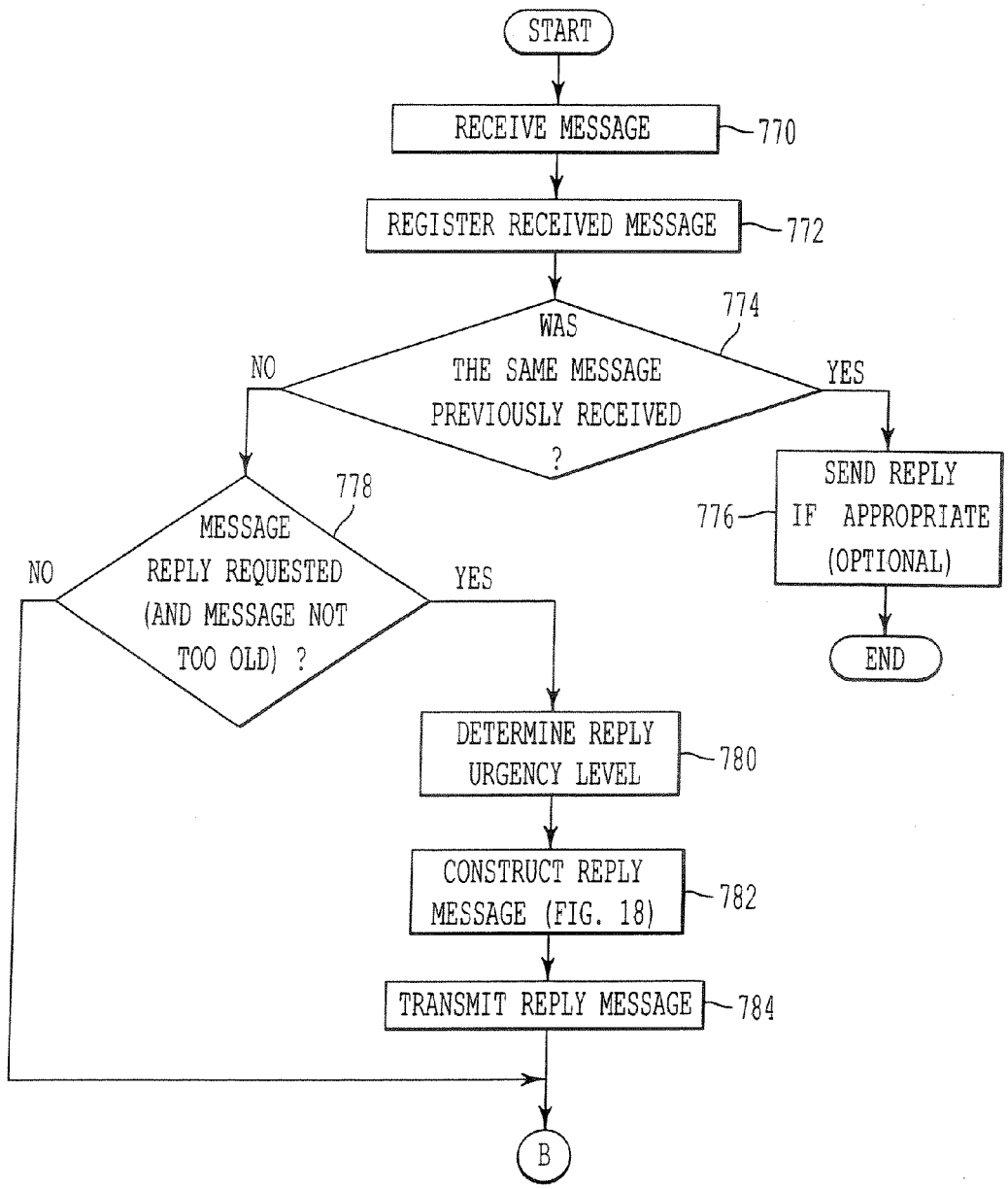
FIGS. 23A, 23B, and 23C illustrate the manner of processing a received connectionless-mode message.
Figure 23B:
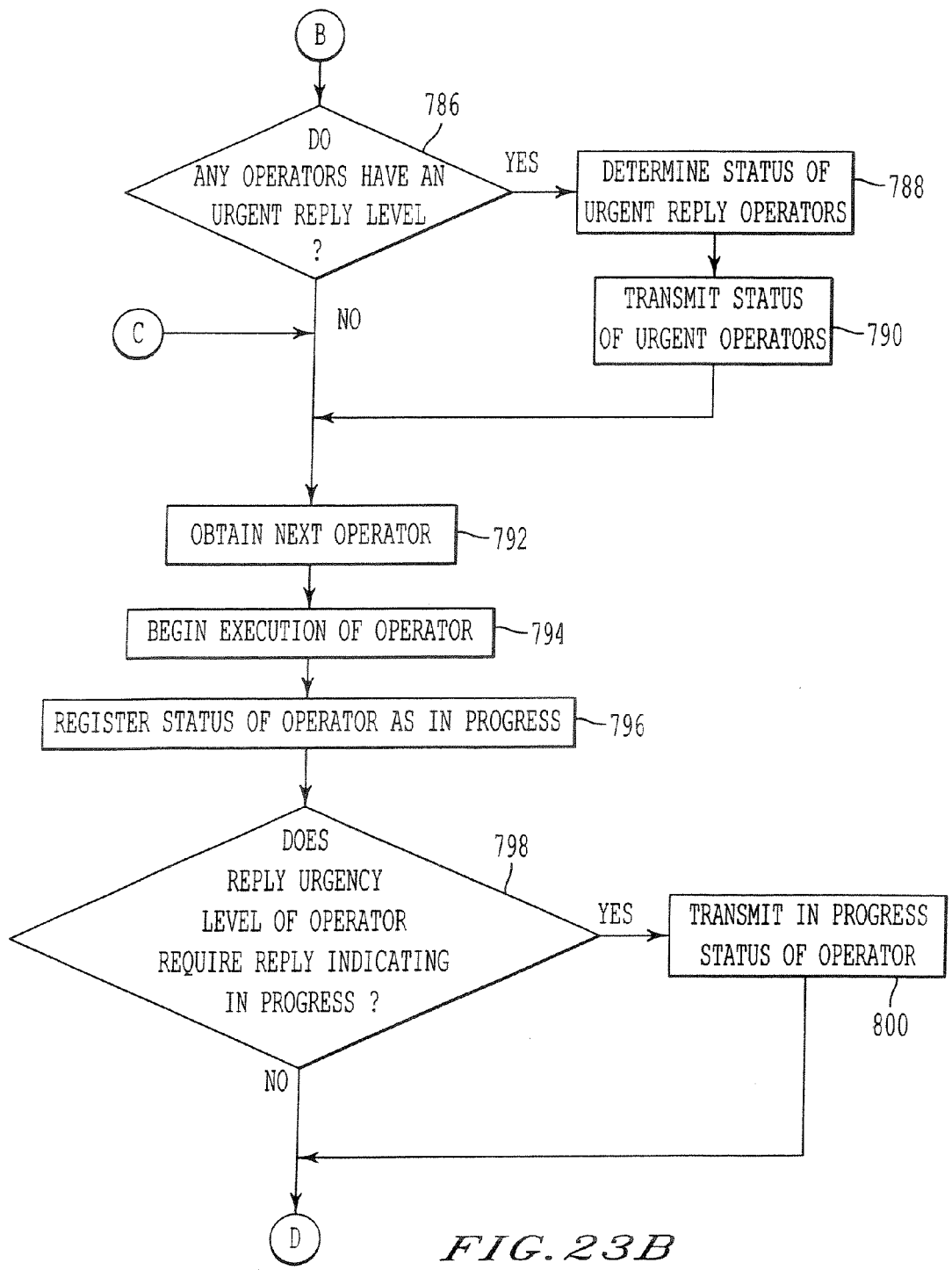
Figure 23C:
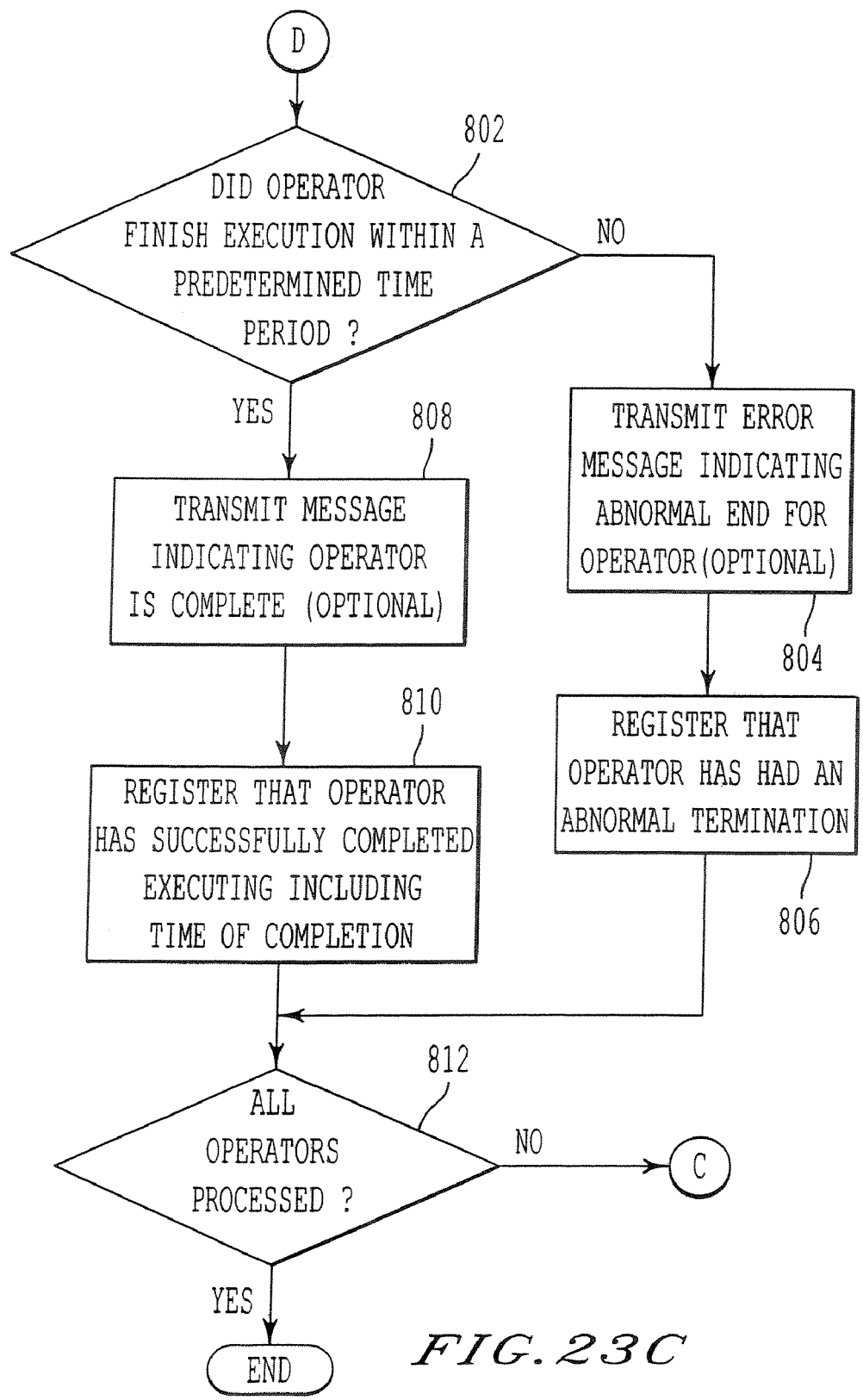

FIGS. 23A, 23B, and 23C illustrate the process which is performed when a transmitted message is received by a receiving device. After starting, step 770 receives a message, and if necessary, the received message is converted to an appropriate format. For example, it may be necessary to change the binary message from the textual representation to the standard binary representation. Step 772 then registers that the message has been received. This registration process is performed in order to know which messages have been received by the receiving device. For example, if an acknowledge of receipt or reply message is never received by the transmitting device, the transmitting device will retransmit the message using a connection-mode of communication. In order to prevent the same message from executing again if the connectionless-mode message was already executed by a reply not received by the transmitting device, a database of received messages will be checked in order to assure that the same message is not executed a second time.

Step 774 then determines if the same message was previously received. This step is performed by determining if a message having the same message ID as the present message was already received. It may be possible that electronic mail messages are generated or received twice and in order to prevent execution of operators associated with the message a second time, control proceeds to step 776 which optionally sends a reply which indicates that the message was received. The reply may be used to indicate that the message was received a second time or the appropriate number of times. Alternatively, step 776 may be omitted, if desired, and the process then ends. If the same message was not previously received, control proceeds from step 774 to step 778 which determines if the received message contains a request for a reply. Also, if the message which has been received is determined to be old based on the time and date contained with the message ID, it may be appropriate not to send any reply as the message may have already been retransmitted using the connection-mode. If a reply is requested, control proceeds to step 780 which determines the reply urgency level. Step 782 then constructs the reply message as illustrated in FIG. 18. If desired, the reply message may be constructed in order to reflect the reply urgency level of the received message. Step 784 then transmits the reply message. From step 784 or a negative answer to step 778, control proceeds to process B illustrated in FIG. 23B.

In FIG. 23B, step 786 determines if any operators contained within the message have an urgent reply level. If one or more operators do have an urgent reply level, step 788 determines the status of the urgent reply operators. As the message has not yet begun to execute, it is probable that the status of the urgent reply operators will be not started or not yet executed. However, step 786, 788, and 790 can be performed at any desired time when processing the received message and if performed at different times, different statuses will result such as execution in progress, execution complete, or execution abnormally terminated, for example. Step 790 then transmits the status of the urgent reply level operators.

Next, the processing of the operators begins. Step 792 obtains the next operator contained within the message. This may be, if appropriate, the first operator of the message. Step 794 then begins execution of the operator in accordance with any parameters associated with the operator. Step 796 then registers that the status of the operator is in the process of execution. Thus, if it is necessary to transmit the status of the operator, a status of in progress or currently executing will be provided. Step 798 then determines if the operator which is executing has a reply urgency level which indicates that a reply should be sent indicating that the operator is in progress. If a reply is required indicating the message is in operation, step 800 is performed which transmits the in progress status of the operator back to the machine which originally transmitted the message. From step 800 or a negative response in step 798, control proceeds to process D illustrated in FIG. 23C.

In FIG. 23C, step 802 determines if the operator finished execution within a predetermined time period. For example, a maximum time period associated with a command is provided and if the execution time for the command exceeds that time period, control proceeds to step 804 which transmits an error message to the original transmitting device indicating an abnormal termination for the operator. The abnormal termination for the operator may also be transmitted or registered when any abnormal termination of the operator occurs. Step 804 is an optional step. Step 806 then registers that the operator has had an abnormal termination in the registration database for operators so that future inquiries will be provided with the status of the operator.

If step 802 determines that the operator has finished execution properly and within the predetermined time period, control proceeds to step 808 which transmits a message to the original transmitting station indicating that the operator has completed performing the desired operation. If desired, step 808 may be optional and omitted. Step 810 then registers that the operator has successfully completed execution and also registers the time of completion. Thus, future inquiries into the status of the operator will indicate that the operator has finished execution at the time execution was complete. From steps 810 and 806, control proceeds to step 812 which determines if all operators have been processed. If they have not, control proceeds to process C in FIG. 23B which continues the process beginning at step 792 in order to process the next operator. After all operators have been processed, the process of FIGS. 23A-23C ends.

Figure 24:
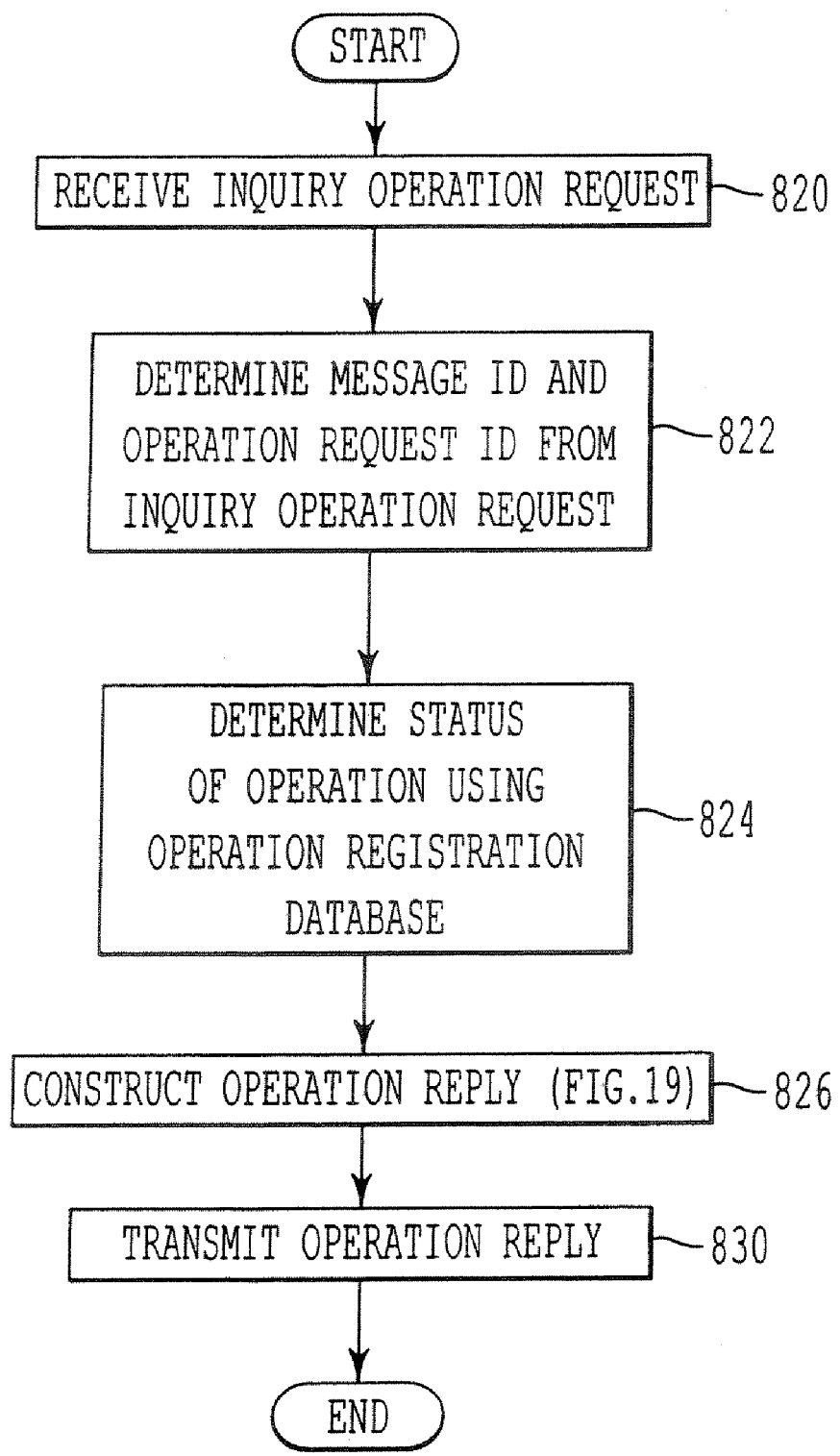
FIG. 24 is a flowchart illustrating the generation of an inquiry operation which determines the status of an operation.

FIG. 24 illustrates a process performed when a machine receives an inquiry message which inquires into the status of an operation, for example using the data structure 640 illustrated in FIG. 17. After starting in FIG. 24, step 820 is executed which receives the inquiry operation request. Step 822 then determines the message ID and the operation request ID from the inquiry operation request. This may be performed by analyzing the information contained within the data structure 640.

Step 824 is then performed which determines the status of the specific operation using the operation registration database which contains information on each of the operators. The status is determined by looking up the corresponding message ID and operation request ID in the registration database. An appropriate status is contained within the database such as that the operation has not started executing, is in progress or is currently executing, has completed executing, has abnormally terminated, or the operation has never been received. Step 826 then constructs the operation reply which returns the status of the message using the data structure 660 illustrated in FIG. 19. The operation reply is then transmitted in step 830 and the process of FIG. 24 then ends.

Figure 25:
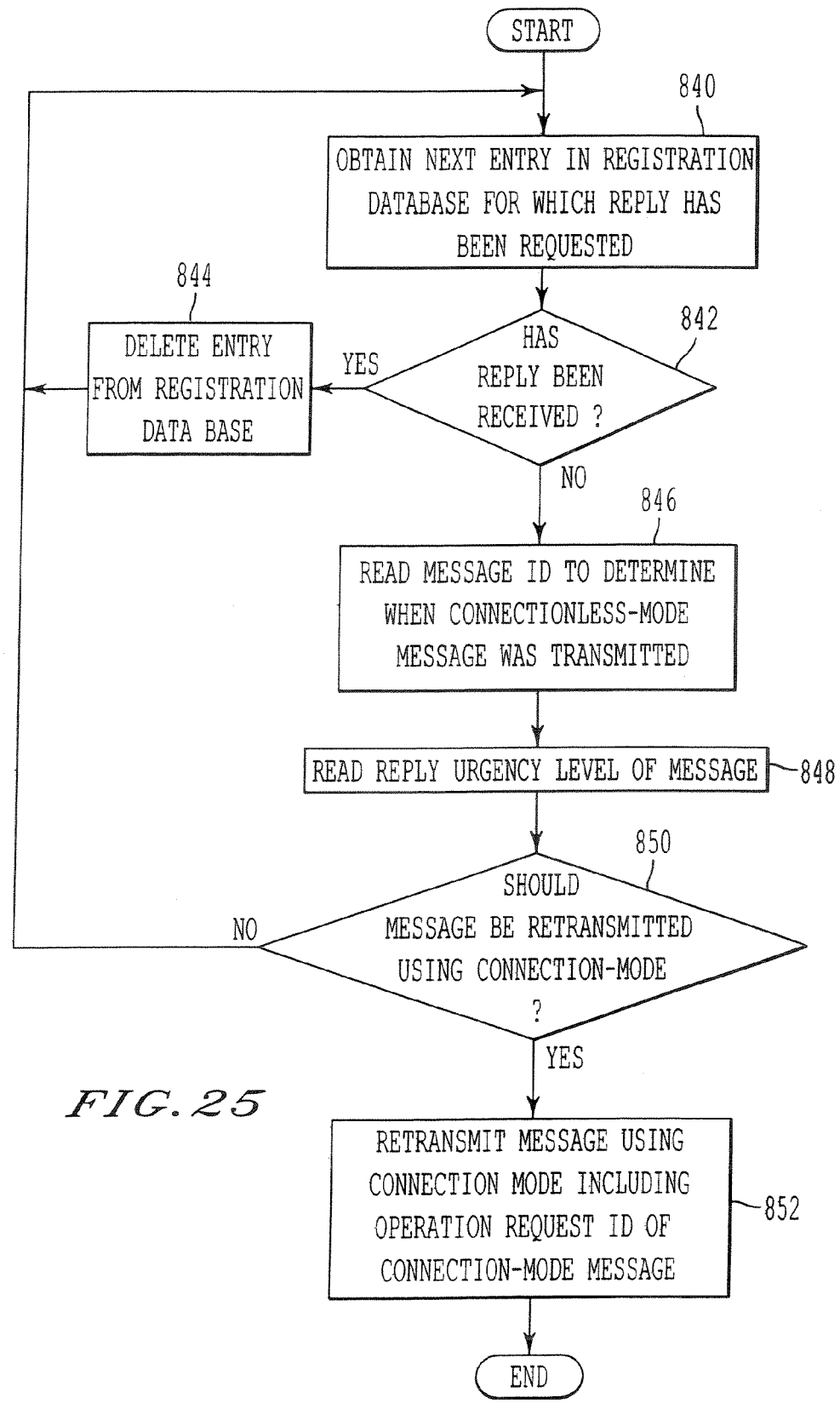
FIG. 25 illustrates a process of monitoring whether requests have been received for messages desiring a reply or acknowledgment.

A feature of this invention is when a connectionless mode message is not properly received, as indicated by not receiving an acknowledgment of receipt, an alternate mode of communication such as a connection-mode of communication is used. FIG. 25 illustrates a process of determining whether the message should be retransmitted using an alternate mode of communication such as a connection-mode message. After starting, step 840 obtains the next entry in the registration database for which a reply has been requested. A registration database is utilized to store each message which has been transmitted for which a reply or acknowledgment is expected. It is to be noted that this process illustrated in FIG. 25 is performed by the machine or a machine associated with the machine transmitting the original message. Step 842 then determines if a reply has been received. If a reply has been received from the original transmitted message, the entry is deleted from the registration database in step 844 and control proceeds back to step 840 which obtains the next entry in the registration database. If step 842 determines that no reply has been received, step 846 is performed which reads the message ID of the message in the registration database to determine when the connectionless-mode message was transmitted. Also, step 848 reads the reply urgency level of the message. Step 850 then determines whether the message should be retransmitted using the connection-mode of communication based on the time the original message was transmitted and the reply urgency level of the message. A table may be constructed containing maximum times corresponding to different urgency levels. For example, an urgent message may require a reply within two minutes to one-half hour, for example, before the message should be retransmitted using a connection-mode of operation. A medium urgency level message may wait from 30 minutes to four hours before the message is retransmitted using the connection-mode of operation. A low level urgency message may be permitted to wait up to 24 hours before the message is retransmitted using the connectionless-mode of operation. If step 850 determines, based on the reply urgency level and/or the time the message was transmitted that the message should not be retransmitted, control returns to step 840. Alternatively, if step 850 determines that the message should be retransmitted, control proceeds to step 852. Step 852 then retransmits the message using the connection-mode of operation. The retransmission of the message includes the operation request ID and the message ID. Also, the registration database is modified in order to properly indicate that the original connectionless-mode message has been retransmitted using the connection-mode of operation. The process of FIG. 25 then ends.

Figure 26:
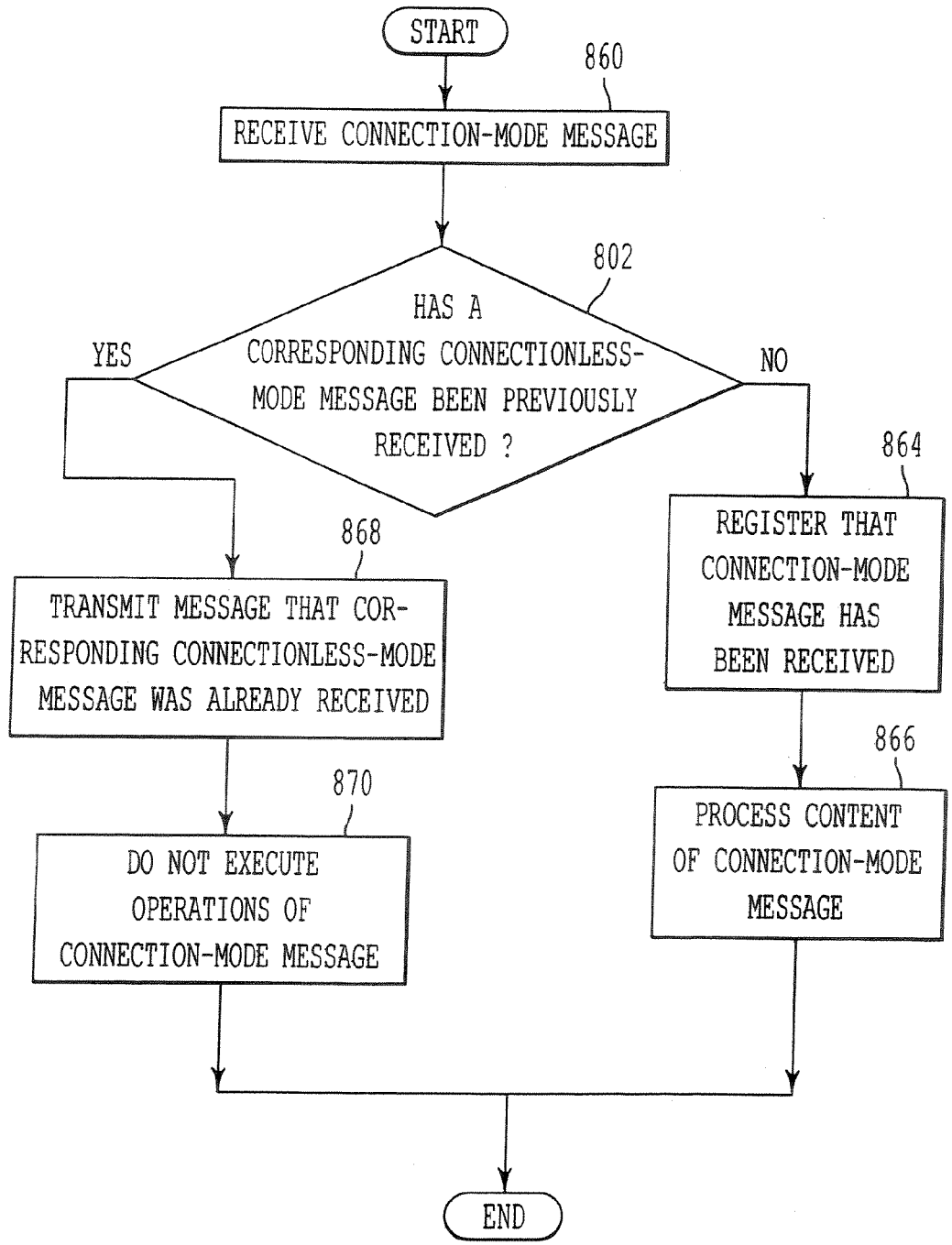
FIG. 26 is a flowchart illustrating the process of receiving a connection-mode message from a transmitting device, performed after the transmitting device does not receive acknowledgment of receipt of a connectionless-mode message which was earlier transmitted.

FIG. 26 illustrates the process of receiving the connection-mode message which has been transmitted after there was a failure to reply to the connectionless-mode message. After starting in FIG. 26, step 860 receives the connection-mode message. Step 862 then determines if a corresponding connectionless-mode message has previously been received. It is possible that the connection-mode message was received before the acknowledgment of the original connectionless mode message was received by the original transmitting device and therefore, the receiving device will receive both the connection-mode message and the connectionless-mode message. If step 862 determines that a corresponding connectionless-mode message has not been previously received, control proceeds to step 864 which registers that the connection-mode message has been received. This registration is performed so that in the event that the corresponding connectionless-mode message is later received, the same message content is not executed a second time. Step 866 then processes the content of the connection-mode message.

If step 862 determines that a corresponding connectionless-mode message has already been previously received, step 868 is performed which transmits a message to the original transmitting device which indicates that the corresponding connectionless-mode message has already been received. This is used to indicate to the original transmitting device that the same message has already been received. Step 870 indicates that the connection-mode message is not executed because the operators within this message have already been processed and their associated functions and commands previously performed. From steps 870 and 866, the process of FIG. 26 ends.

The present invention is described with respect to a message and an operator. However, where reasonable, the functions and aspects associated with messages may be applied to individual operators, and vice versa. For example, the present invention allows an inquiry operation to be performed as to the status of a specific operation. However, it is also possible to determine whether a specific message was received by the receiving device. This is useful for medium to low priority messages when no reply has been received and is utilized for the purpose of determining if the message was received and processed but the acknowledgment of receipt and process was never received.

While the present invention has been described with respect to business office devices, the teachings are equally applicable to any machine containing sensors which is remotely monitored, diagnosed, or communicated with, and to general purpose computers.

This invention may be conventionally implemented using a conventional general purpose digital computer programmed according to the teachings of the present invention, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuit, as will be readily apparent to those skilled in the art.

The present invention also includes a computer program product which is a storage medium including instructions which can be used to program a computer to perform a process of the invention. The storage medium can include, but is not limited to, any type of disk including floppy disks, optical disks, CD-ROMs, and magneto-optical disks, ROMs, RAMs, EPROMs, EEPROMs, magnetic or optical cards, or any type of media suitable for storing electronic instructions.

The above described system may used with conventional machines including conventional business office machines using add-on equipment constructed in accordance with the present teachings and installed in or outside of the machine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of controlling communications, comprising:
   automatically generating, by a first monitored device, a first message;
   automatically transmitting, from the first monitored device, the first message to a second monitoring device using a first mode of communication;
   monitoring, by the first monitored device, whether the second monitoring device transmits, to the first monitored device, a response to the first message; and
   transmitting, by the first monitored device, a second message to the second monitoring device using a second mode of communication when the step of monitoring determines that the first monitored device has not received a response to the first message from the second monitoring device,
   wherein the first monitored device is one of a printer, a facsimile machine, a facsimile server, a scanner, a copier, a metering system, and a vending machine.

2. The method according to claim 1, wherein the step of transmitting the second message comprises:
   transmitting the second message as a connection-mode message to the second monitoring device.

3. The method according to claim 2, wherein:
   the step of transmitting the connection-mode message is performed when the first monitored device does not receive a response to the first message within a predetermined time period.

4. The method according to claim 3, further comprising the step of:
   determining the predetermined time period based on an urgency level of a requested reply.

5. The method according to claim 2, wherein the step of transmitting the connection-mode message comprises:
   transmitting the connection-mode message using a cable.

6. The method according to claim 2, further comprising the step of:
   processing contents of the first message before transmitting the second message.

7. The method according to claim 2, further comprising the steps of:
   analyzing contents of the first message; and
   transmitting a reply indicating the status of an operator within the message from the second monitoring device to the first monitored device.

8. The method according to claim 7, wherein the step of transmitting a reply comprises:
   transmitting one of an indication that the operator has not been received, has not yet begun executing, is in the process of executing, has finished executing, or has terminated executing abnormally.

9. The method according to claim 1, wherein the step of transmitting the connection-mode message comprises:
   transmitting the connection-mode message using telephone communication.

10. The method according to claim 9, wherein the step of transmitting the connection-mode message comprises:
    transmitting the connection-mode message using the telephone communication without using an Internet connection.

11. The method according to claim 1, wherein the step of transmitting the second message comprises:
    displaying the second message on a display of the first monitored device.

12. The method according to claim 11, wherein the step of displaying the second message comprises:
    displaying a message indicating that service for the first monitoring device is needed.

13. The method according to claim 11, wherein the step of displaying the second message comprises:
    displaying a message that an acknowledgment of receipt of the first message has not been received.

14. The method according to claim 1, wherein the step of transmitting the first message comprises:
    transmitting the first message as a connectionless-mode message to the second monitoring device.

15. A system for controlling communications, comprising:
    means for automatically generating, by a first monitored device, a first message;
    means for automatically transmitting, from the first monitored device, the first message to a second monitoring device using a first mode of communication;
    means for monitoring, by the first monitored device, whether the second monitoring device transmits, to the first monitored device, a response to the first message; and
    means for transmitting, by the first monitored device, a second message to the second monitoring device using a second mode of communication when the means for monitoring determines that the first monitored device has not received a response to the first message from the second monitoring device,
    wherein the first monitored device is one of a printer, a facsimile machine, a facsimile server, a scanner, a copier, a metering system, and a vending machine.

* * * * *